US012801409B1

(12) United States Patent
Noorani et al.

(10) Patent No.: US 12,801,409 B1
(45) Date of Patent: Nov. 17, 2026

(54) DYNAMICALLY GENERATING USER INTERFACE CONFIGURATIONS BASED ON CONTENT RELEVANCE

(71) Applicant: Dropbox, Inc., San Francisco, CA (US)

(72) Inventors: Noorain Noorani, New York, NY (US); Andrew Donald Yates, San Francisco, CA (US); Westin Lohne, Millstone Township, NJ (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/305,158

(22) Filed: Aug. 20, 2025

(51) Int. Cl.
*G06F 9/451* (2018.01)

(52) U.S. Cl.
CPC .................................... *G06F 9/451* (2018.02)

(58) Field of Classification Search
CPC ....................................................... G06F 9/451
USPC ......................................................... 715/765
See application file for complete search history.

(56) References Cited

U.S. PATENT DOCUMENTS

| | | | | |
|---|---|---|---|---|
| 6,105,326 | A | 8/2000 | Schmidt-Lutz | |
| 7,640,162 | B2 | 12/2009 | Ramsey et al. | |
| 7,672,908 | B2 | 3/2010 | Tomasic et al. | |
| 8,032,823 | B2 | 10/2011 | Tomasic et al. | |
| 8,065,310 | B2 | 11/2011 | Yu et al. | |
| 8,566,699 | B2 | 10/2013 | Tomasic et al. | |
| 9,092,524 | B2 | 7/2015 | Yu et al. | |
| 10,417,299 | B1 | 9/2019 | Terleski et al. | |
| 11,120,057 | B1 * | 9/2021 | McNabney | G06F 16/38 |
| 11,551,697 | B2 * | 1/2023 | Ramasamy | G06F 16/248 |
| 11,868,429 | B1 * | 1/2024 | Stone | G06N 3/0464 |
| 12,229,803 | B2 * | 2/2025 | Yates | G06Q 30/0269 |
| 12,406,007 | B2 * | 9/2025 | Srinivasan | G06F 16/90335 |
| 2005/0154686 | A1 * | 7/2005 | Corston | G06F 16/3346 707/E17.058 |
| 2017/0337284 | A1 | 11/2017 | Garrett et al. | |
| 2018/0150572 | A1 * | 5/2018 | Yates | G06Q 10/40 |
| 2018/0239740 | A1 * | 8/2018 | Xiao | G06F 17/16 |

(Continued)

FOREIGN PATENT DOCUMENTS

EP 1574972 A2 9/2005

OTHER PUBLICATIONS

Charlie Chang, Screenshot of "ChatGPT Tutorial: How to use chatGPT for beginners" video available online at <https://www.youtube.com/watch?v=Gaf_jCnA6mc>, published Apr. 4, 2023, 10 pages. (Year: 2023).*

*Primary Examiner* — Reza Nabi
(74) *Attorney, Agent, or Firm* — Keller Preece PLLC

(57) ABSTRACT

The present disclosure relates to systems, non-transitory computer-readable media, and methods that implement a generative interface framework to dynamically configure user interfaces to incorporate various content modules that are responsive to queries. For example, one or more embodiments involve generating a tool call instructing a data retrieval tool to retrieve a content item corresponding to a query received from a client device. Embodiments further involve determining a content item score indicating a relevance of the content item to the query and determining, based on the content item score, a content module score for a content module that incorporates the content item. Based on the content module score, a user interface having one or more interface elements corresponding to the content module can be generated as a response to the query.

20 Claims, 23 Drawing Sheets

(56) References Cited

U.S. PATENT DOCUMENTS

| | | | | |
|---|---|---|---|---|
| 2018/0260736 | A1* | 9/2018 | Yates | H04L 67/535 |
| 2019/0102693 | A1* | 4/2019 | Yates | G06N 20/00 |
| 2024/0273793 | A1* | 8/2024 | DeCharms | G06F 40/109 |
| 2025/0088538 | A1* | 3/2025 | Saripalli | H04L 63/20 |
| 2025/0131001 | A1* | 4/2025 | Yates | G06F 7/08 |
| 2025/0217371 | A1* | 7/2025 | Hamid | G06F 16/24578 |
| 2025/0298836 | A1* | 9/2025 | Yates | G06F 16/432 |

* cited by examiner

350

DYNAMICALLY GENERATING USER INTERFACE CONFIGURATIONS BASED ON CONTENT RELEVANCE

BACKGROUND

Recent years have seen significant development in hardware and software platforms that facilitate responding to queries from client devices. For instance, search engines retrieve and provide digital content in response to a search query. Further, chat interfaces enable client devices to obtain responses to queries through conversation-like communications. Despite these advances, existing query response systems exhibit a number of technical problems in relation to flexibility and accuracy.

For instance, existing query response systems are often inflexible in that they typically implement a rigid format for responding to a query. In particular, many existing systems provide a static experience in responding to a query regardless of the intent of the query. To illustrate, some systems rigidly provide a combination of content types (e.g., generated answers, images, messages, and emails) in response to a search query even where one or more of the content types lack relevancy to the search intent of the query. Thus, these systems tend to present the same content types using the same configuration in response to various queries having varied needs.

In addition to problems with inflexibility, existing query response systems also fail to operate accurately. In particular, by providing content via a standardized format that rigidly incorporates certain content types, existing systems may provide a response to a query that is generally irrelevant to the query. To illustrate, where a query is targeting a particular content type, many existing systems respond with additional content types that fail to meet the intent of the query. Thus, these systems often produce results having content that is not accurately responsive to queries.

These along with additional problems and issues exist with regard to conventional query response systems.

SUMMARY

One or more embodiments described herein provide benefits and/or solve one or more problems in the art with systems, methods, and non-transitory computer-readable media that dynamically configure user interfaces in response to queries based on the relevancy of retrieved content. To illustrate, the disclosed systems can retrieve various content items of various content item types in response to a query. The disclosed systems can further determine the relevancy of the retrieved content items and incorporate those content items having a particular relevancy within the response to the query. In some cases, the disclosed systems use one or more large language models in retrieving and evaluating the relevancy of the content items. Further, in some embodiments, the disclosed systems incorporate the content items into content modules and respond to the query by configuring the user interface to display one or more content modules that are relevant to the intent of the query. In this manner, the disclosed systems accurately respond to queries by flexibly configuring interface presentations of relevant content.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

This disclosure describes one or more embodiments of an interface module configuration system 100 that uses content modules and corresponding relevancy indicators to present content within user interfaces in response to queries. In particular, in some embodiments, the interface module configuration system 100 retrieves various content items upon receiving a query. The interface module configuration system 100 can further determine relevancies for the individual content items as well as the content modules that incorporate those content items. Based on these relevancies, the interface module configuration system 100 can generate a user interface that is responsive to the query by displaying those content modules (and/or related elements) determined to be relevant. For instance, in some cases, the interface module configuration system 100 employs a frontend interface orchestrator to configure the user interface based on the relevancies of the content modules (and other factors, such as medium and device constraints).

Figure 1A:
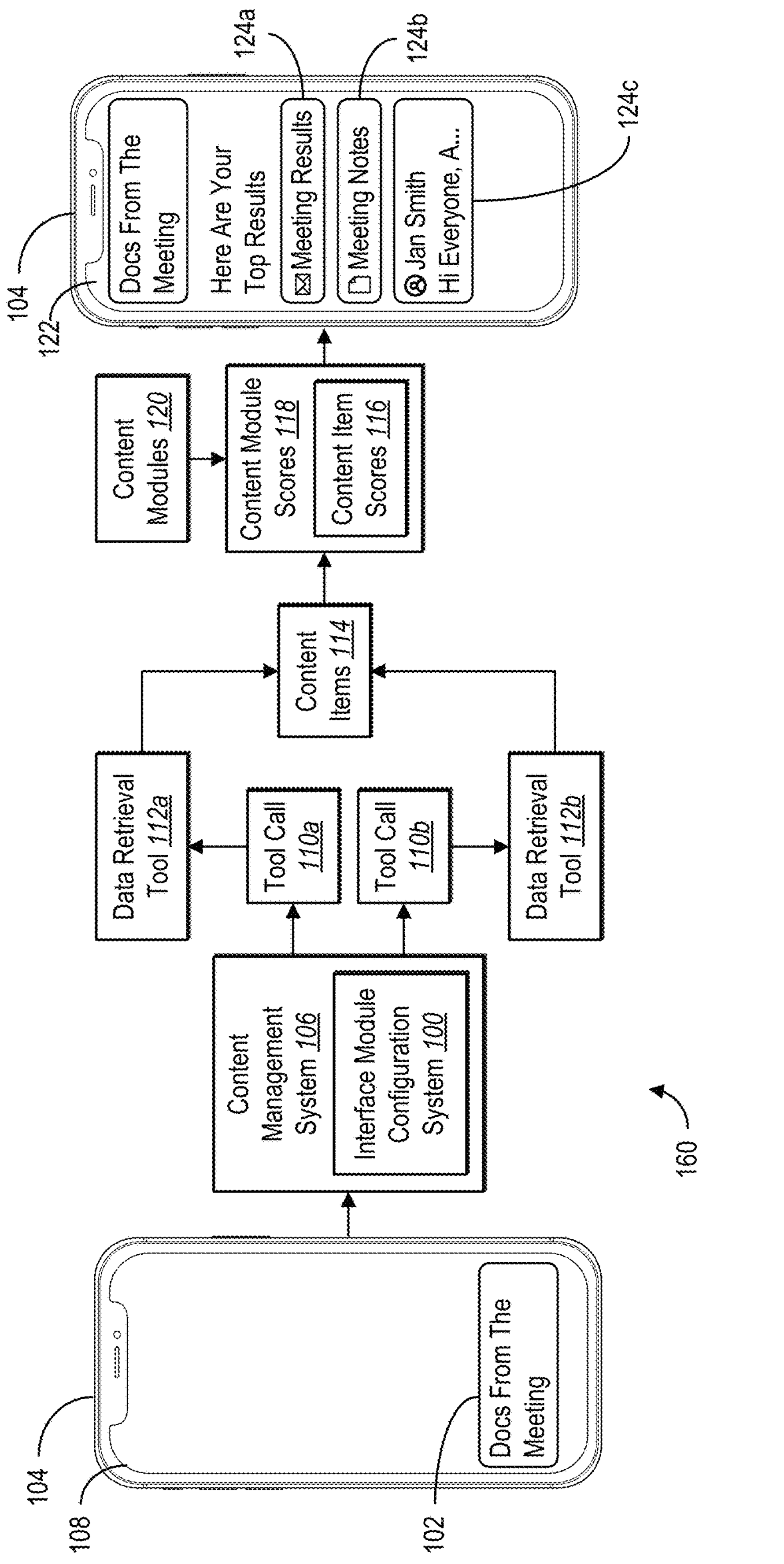
FIGS. 1A-1B illustrate examples of configuring user interfaces using content modules in response to queries in accordance with one or more embodiments.
Figure 1B:
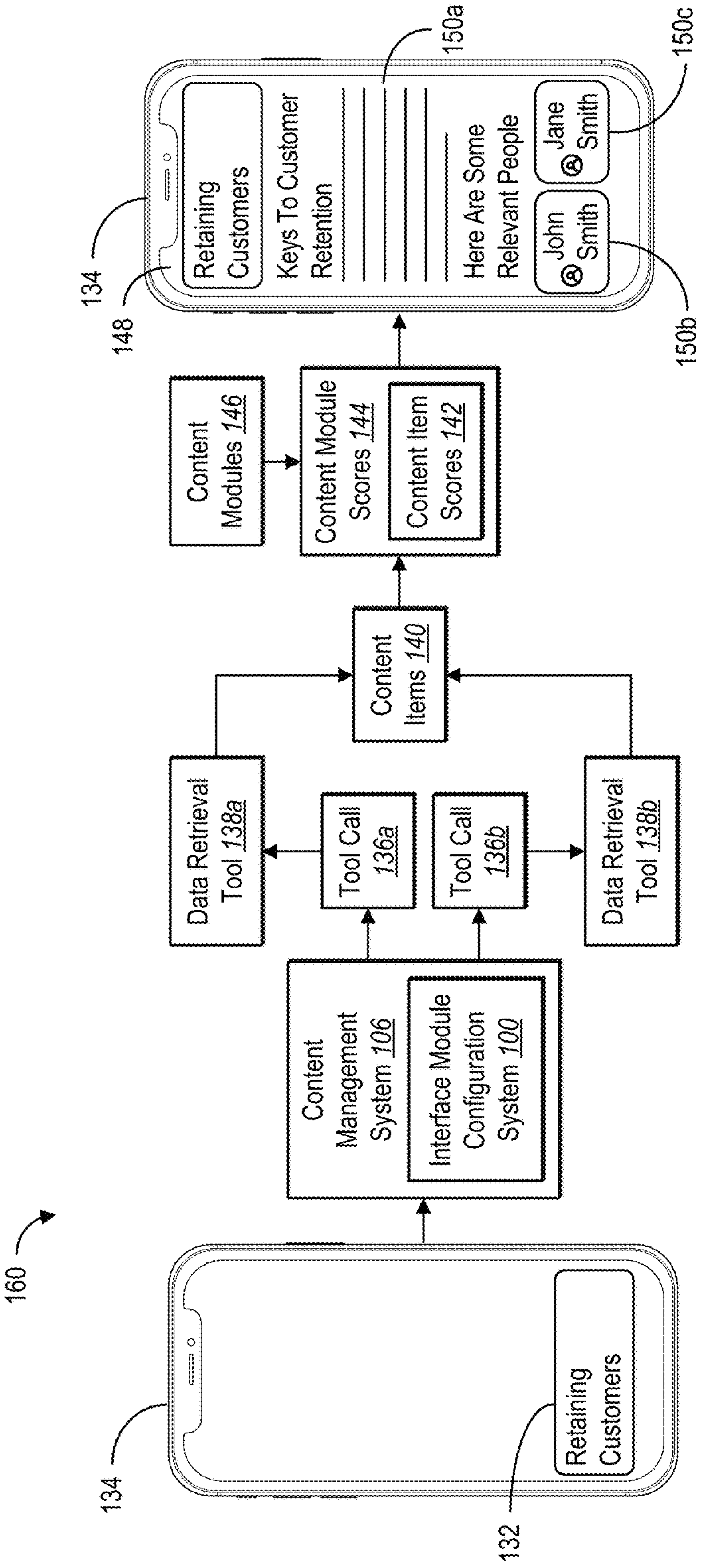

FIGS. 1A-1B illustrate examples of the interface module configuration system 100 configuring user interfaces using content modules in response to queries in accordance with one or more embodiments. In particular, FIGS. 1A-1B illustrate the interface module configuration system 100 implementing a generative interface framework 160 to generate user interfaces having various configurations that respond to various queries. FIG. 1A illustrates an example of generating a user interface having a first configuration in response to a first query, and FIG. 1B illustrates an example of generating a user interface having a second configuration in response to a second query. Thus, together, FIGS. 1A-1B illustrate that the interface module configuration system 100 can respond to various queries using user interfaces of various configurations.

For instance, FIG. 1A shows the interface module configuration system 100 receiving a first query 102 from a first client device 104. The interface module configuration system 100 can receive the first query 102 through various query mediums displayed via a graphical user interface 108. To illustrate, the graphical user interface 108 can include a search interface through which the interface module configuration system 100 receives a search query or a chat interface through which the interface module configuration system 100 receives a chat query. In some cases, the first query 102 includes a request for information, such as a request for one or more content items and/or information derived from such content items. Further, the first query 102 can include natural language text or can include a selection of options input via the first client device 104. For instance, in some cases, the interface module configuration system 100 provides a plurality of selectable options—such as pre-determined optional queries—to the first client device 104. Thus, the interface module configuration system 100 can receive the first query 102 by detecting a selection of one of the selectable options.

As illustrated, the interface module configuration system 100 can operate as part of a content management system 106. For instance, the interface module configuration system 100 can operate to respond to queries using content items stored and maintained on the content management system 106. For instance, in some implementations, the query medium displayed via the graphical user interface 108 includes a query medium implemented via the content management system 106. In some cases, the first client device 104 corresponds to (e.g., is registered to) a user account of the content management system 106 and accesses the query medium through the user account. In certain embodiments, however, the interface module configuration system 100 operates outside the content management system 106.

As shown in FIG. 1A, in response to receiving the first query 102, the interface module configuration system 100 generates tool calls 110*a*-110*b*. In one or more embodiments, each of the tool calls 110*a*-110*b* corresponds to a particular data retrieval tool and requests or instructs the data retrieval tool to retrieve one or more content items that correspond to the first query 102. For instance, as shown, the tool call 110*a* corresponds to a data retrieval tool 112*a*, and the tool call 110*b* corresponds to a data retrieval tool 112*b*.

In some cases, the data retrieval tools 112*a*-112*b* include tools of the content management system 106. In some embodiments, however, the data retrieval tools 112*a*-112*b* include tools that operate as part of external, third-party systems. Thus, in certain cases, each of the tool calls 110*a*-110*b* includes an application programming interface (API) call for a corresponding third-party system, and the interface module configuration system 100 uses each of the tool calls 110*a*-110*b* to invoke the data retrieval tool of the corresponding third-party system.

Additionally, in some embodiments, each of the data retrieval tools 112*a*-112*b* corresponds to content items of a particular content type. For instance, the data retrieval tool 112*a* can correspond to a first content type, and the data retrieval tool 112*b* can correspond to a second content type. Thus, each of the tool calls 110*a*-110*b* can include a request or instruction for the corresponding data retrieval tool to retrieve one or more content items of the corresponding content type. As such, the interface module configuration system 100 can respond to a query by employing multiple data retrieval tools to retrieve content items of various content types.

Indeed, FIG. 1A illustrates the interface module configuration system 100 receiving, retrieving, accessing, or otherwise obtaining content items 114 in response to the first query 102. In particular, the interface module configuration system 100 receives, accesses, retrieves, or otherwise obtains the content items 114 via the data retrieval tools 112*a*-112*b*. For instance, the interface module configuration system 100 can receive a first set of content items (e.g., of a first content type) from the data retrieval tool 112*a* and receive a second set of content items (e.g., of a second content type) form the data retrieval tool 112*b*.

As illustrated, the interface module configuration system 100 further determines content item scores 116 for the content items 114. The interface module configuration system 100 can determine a content item score for each of the content items 114. As will be discussed more below, the interface module configuration system 100 can determine a content item score for a content item based on a relevance of the content item to the first query 102. In some cases, the interface module configuration system 100 further determines the content item score based on other characteristics of the content item.

Additionally, the interface module configuration system 100 determines content module scores 118 for content modules 120 with respect to the content items 114 retrieved in response to the first query 102. As will be discussed below, each of the content modules can include or otherwise correspond to one or more content items from the content items 114. For instance, in some cases, each content module includes content items of the same content type or related content types. As will be discussed more below, the interface module configuration system 100 can determine a content module score for a content module based on a relevance of the content module to the first query 102. Further, as shown, the interface module configuration system 100 can determine the content module scores 118 based on the content item scores 116. For instance, the interface module configuration system 100 can determine the content module score for a content module based on the content item scores of the content items corresponding to the content module. In some cases, the interface module configuration system 100 determines the content module score for a content module based on one or more additional characteristics.

As further shown, the interface module configuration system 100 generates, for the first client device 104, a user interface 122 based on the content item scores 116 and/or the content module scores 118. For instance, the interface module configuration system 100 generates the user interface 122 to include one or more of the content modules 120 and their corresponding content items. In particular, the interface module configuration system 100 generates the user interface 122 to include a plurality of interface elements 124*a*-124*c* corresponding to a plurality of content items. In some cases, the interface elements 124*a*-124*c* correspond to the same content module. In some instances, however, the interface elements 124*a*-124*c* correspond to different content modules. More information regarding content modules will be provided below.

Indeed, FIG. 1A illustrates the interface module configuration system 100 generating the user interface 122 to include interface elements that are responsive to the first query 102, which requests documents related to a meeting. In particular, the user interface 122 includes a first interface element 124*a* for an email message related to the meeting, a second interface element 124*b* for a text document related to the meeting, and a third interface element 124*c* for a message or chat log related to the meeting. In some cases, the interface elements 124*a*-124*c* each include a link to the corresponding document or an attachment of the corresponding document, though other elements corresponding to the documents can be used in various embodiments. As further indicated in FIG. 1A, the interface elements 124*a*-124*c* can correspond to those content items determined to be the top results. In other words, the interface elements 124*a*-124*c* can correspond to the content items determined to be the most relevant to the first query 102 based on the content item scores 116 and/or the content module scores 118.

FIG. 1B shows the interface module configuration system 100 responding to a second query 132 received from a second client device 134. Upon receiving the second query 132, the interface module configuration system 100 generates a tool call 136*a* instructing or requesting a data retrieval tool 138*a* to retrieve one or more content items corresponding to the second query 132 and a tool call 136*b* instructing or requesting a data retrieval tool 138*b* to retrieve one or more additional content items corresponding to the second query 132. The interface module configuration system 100 receives, retrieves, accesses, or otherwise obtains content items 140 via the data retrieval tools 138*a*-138*b*.

As further shown, the interface module configuration system 100 determines content item scores 142 for the content items 140 and further determines content module scores 144 for content modules 146. For instance, as discussed above, each of the content modules 146 can include or otherwise correspond to one or more of the content items 140, and the interface module configuration system 100 can determine the content module scores 144 based on the content item scores of the corresponding content items.

The interface module configuration system 100 generates, for the second client device 134, a user interface 148 based on the content item scores 142 and/or the content module scores 144. For instance, the interface module configuration system 100 generates the user interface 148 to include one or more of the content modules 146. In particular, FIG. 1B illustrates the interface module configuration system 100 generating the user interface 148 to include an interface element 150*a* derived from one or more content items and interface elements 150*b*-150*c* corresponding to additional content items. The interface elements 150*a*-150*c* can correspond to the same content module or different content modules.

Indeed, FIG. 1B illustrates the interface module configuration system 100 generating the user interface 148 to include interface elements that are responsive to the second query 132, which requests information regarding the retention of customers. In particular, the user interface 148 includes an interface element 150*a* providing responsive text that is generated or extracted from one or more content items obtained via the data retrieval tools 138*a*-138*b*. The user interface 148 further includes interface elements 150*b*-150*c* providing information for relevant contacts.

Thus, as shown in FIGS. 1A-1B, the interface module configuration system 100 can respond to queries according to their needs and/or intent.

Indeed, one or more embodiments of the interface module configuration system 100 provide improvements or advantages over existing systems. For example, embodiments of the interface module configuration system 100 provide more flexibility with respect to responding to queries using content items. In particular, by generating user interfaces that include interface elements based on the relevance of content items and corresponding content modules, the interface module configuration system 100 can flexibly accommodate the varied needs and/or intents of varied queries. Indeed, the interface module configuration system 100 implements a flexible approach via a dynamic format that is responsive (e.g., relevant) to received queries and that vary to target the varied needs and/or intents of those queries.

Additionally, one or more embodiments of the interface module configuration system 100 provide improved accuracy when compared to existing systems. In particular, by using a dynamic format in which interface elements corresponding to content modules are provided based on relevance, the interface module configuration system 100 generates user interfaces that are more accurately responsive to queries. Indeed, in many cases, the interface module configuration system 100 configures the user interfaces to accurately target the needs and/or intents of queries. In many cases, the interface module configuration system 100 omits, from the user interfaces, content items or content types that exhibit relatively little to no relevance.

As illustrated by the foregoing discussion, the present disclosure utilizes a variety of terms to describe features and advantages of the interface module configuration system 100. Additional detail is now provided regarding the meaning of such terms. For example, as used herein, the term "query" refers to a request or prompt for information. For instance, a query can refer to a request or prompt to retrieve information or to generate a response providing information. To illustrate, a query can include a question or a directive. As will be explained below, the interface module configuration system 100 can respond to a query by providing one or more content items and/or content generated from one or more content items. A query can include natural language text or can include a selection from a plurality of options. Relatedly, as used herein, the term "follow-up query" refers to a query that follows a previous query. For instance, a follow-up query can include a query that continues a conversation including a previous query or refers to or relies on a previous query.

Additionally, as used herein, the term "multi-turn conversation" refers to a sequence of queries. In particular, a multi-turn conversation can refer to a sequence of related queries, such as a sequence of queries corresponding to the same or related subject matter. In some cases, a multi-turn conversation includes one or more responses to the sequence of queries. For instance, a multi-turn conversation can include iterations of a pattern that includes a query and a response to the query. To illustrate, a multi-turn conversation can include a sequence of queries submitted and responses provided via a chat interface or an interface for interacting with a large language model. In some instances, a multi-turn conversation includes a sequence of queries submitted by a client device (and corresponding responses provided to the client device). A multi-turn conversation can further include one or more additional inputs from a client device, such as a statement or a selection from a plurality of options.

Additionally, as used herein, the term "query medium" refers to a medium through which queries are received and responses provided. In particular, a query medium can refer to a platform or interface that manages communications involving queries and responses. For instance, a query medium can include, but is not limited to, a chat interface, a search interface, or an interface for interacting with a large language model.

As used herein, the term "content item" refers to a collection of data that is interpretable by a computing device (e.g., a client device) to present information to a user. For instance, a content item can include a digital object (or portion of a digital object), a digital file (or portion of a digital file), or a collection (e.g., a folder) of digital objects and/or digital files. To illustrate, a content item can include, but is not limited to, a digital text file, a digital image, a digital audio file, a webpage, a website, a digital video file, a web file, a link, an account/user profile, a contact (e.g., a set of contact information or a profile of a particular contact), an email message, a social media message, a text message, or some other type of digital file or digital object. In some cases, a content item can refer to a locally stored item, a remotely stored (e.g., cloud-based) item, or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection.

Additionally, as used herein, the term "content type" refers to a type of a content item. In particular, a content type can refer to a category or classification associated with a content item, such that one or more characteristics are common among content items of the same content type. The level of abstraction of a content type varies in various embodiments. For instance, separate content types can include separate classifications for digital text files, digital images, digital audio files, digital video files, web pages, websites, web files, links, account/user profiles, contacts, email messages, social media messages, or text messages. In some cases, a content type includes a classification that covers a plurality of the aforementioned content items (e.g., a web-based classification for web pages, websites, and web files).

Further, as used herein, the term "content item score" refers to a score indicating a strength of correspondence between a content item and a query. In particular, a content item score can include a measure of the relevance of a content item to a query (e.g., a measure of the relevance of the content of the content item to the query). In some cases, a content item score further includes a measure of other characteristics of a content item. For instance, a content item score can incorporate the quality of the content item (e.g., the truthfulness of a text document or the image quality of a digital image). A content item score can include a numerical score, a classification, or some other annotation attributed to a content item.

As used herein, the term "interface element" refers to a visual element of a user interface (e.g., a graphical user interface) displayed by a computing device. For instance, an interface element can include a visual element of a user interface generated in response to a query. An interface element can include an interactive element or a non-interactive element. Further, an interface element can include an element that corresponds to one or more content items. To illustrate, an interface element can include a content item (e.g., a display of the contents of the content item), a link to a content item, an attachment of a content item, or some other indication of a content item. In some cases, an interface element includes text, an image, and/or audio derived from or generated based on one or more content items (e.g., a summary of a content item, a description of a content item, an audio reading of a content item, or information generated from a content item). Other examples of interface elements include buttons, selection lists, or media viewers. In some instances, an interface element corresponds to a content module regardless of the particular content items associated with the content module. For instance, in some cases, an interface element includes a title, a heading, or a sub-heading of a content module or some other element that is generated for the module regardless of the particular associated content items.

Additionally, as used herein, the term "content module" refers to a configurable unit of interface elements that includes, is derived from, or otherwise corresponds to one or more content items. For instance, a content module can refer to a configurable unit of interface elements that is displayable with or as an alternative to one or more other content modules. Indeed, as will be discussed in more detail below, the interface module configuration system 100 can generate a user interface that includes a content module, such as by including one or more interface elements of the content module (e.g., the disclosure can refer to inclusion of a content module or inclusion of interface elements corresponding to a content module). Thus, the interface module configuration system 100 can generate user interfaces having varied configurations by generating the user interfaces to include various combinations of content modules. In some cases, a content module corresponds to a single content type in that the content module incorporates (e.g., includes or is derived from) one or more content items of one content type. In some implementations, however, a content module corresponds to multiple content types (e.g., incorporates content items of multiple content types).

Further, as used herein, the term "content module score" refers to a score indicating a strength of correspondence between a content module and a query. In particular, a content module score can include a measure of the relevance of a content module to a query. For instance, a content module score can incorporate the content item scores of the corresponding content items. In some cases, a content module score further includes a measure of other characteristics of a content module. For instance, a content module score can incorporate the number of corresponding content items. A content module score can include a numerical score, a classification, or some other annotation attributed to a content module.

As used herein, the term "tool call" refers to a request or prompt to implement a tool, such as a computer-implemented tool. For instance, a tool call can refer to a request or prompt to execute a computer-implemented tool in performance of a corresponding function. To illustrate, a tool call can include a request or prompt to retrieve one or more content items. In some cases, a tool call indicates the content items to be retrieved, indicates the subject matter of the content items to be retrieved, or provides some other indication that guides the retrieval process. In some implementations, a tool call includes a format (e.g., content and structure) that is particular to the computer-implemented tool or the system on which the computer-implemented tool operates. To illustrate, a tool call can include an API call formatted to a system upon which a targeted computer-implemented tool operates.

Additionally, as used herein, the term "data retrieval tool" refers to a computer-implemented tool for retrieving data. For instance, a data retrieval tool can refer to a computer-implemented tool for retrieving one or more content items.

In some cases, a data retrieval tool retrieves one or more content items in response to a tool call. Further, in some instances, a data retrieval tool retrieves one or more content items requested by the tool call (e.g., content items specifically requested by the tool call, content items of a content item type indicated by the tool call, or content items having subject matter indicated by the tool call). A data retrieval tool can operate to retrieve content items of a single content type or content items of various content types.

As mentioned above, in some embodiments, the interface module configuration system 100 operates as part of a content management system. As used herein, the term "content management system" refers to a computer-implemented system for managing digital content. In particular, a content management system can refer to a computer-implemented system for managing one or more content items. In some cases, a content management system is particular to a computing device and manages the content items of the computing device. For instance, a content management system can include a system that operates on the computing device and manages the content items that are stored locally on the computing device. In some instances, however, a content management system is accessible to and/or can be used by a plurality of computing devices. For instance, a content management system can include a remote platform hosted by one or more server devices and accessible by various client devices over a network. In some cases, a content management system manages content items for a plurality of user accounts and allows a user account to access, generate, store, and/or otherwise manage content items of the user account.

Additionally, in one or more embodiments, the interface module configuration system 100 implements a generative interface framework to respond to queries. As used herein, the term "generative interface framework" refers to a framework for generating user interfaces in response to queries. To illustrate, a generative interface framework can refer to a process for responding to a query that involves retrieving content items, scoring the content items, scoring content modules, and generating a user interface that includes one or more interface elements corresponding to one or more of the content modules based on the determined scores. A generative interface framework can further include the components used to execute the process, such as one or more data retrieval tools, an interface orchestrator, and/or a rendering engine.

As used herein, the term "interface orchestrator" refers to a computer-implemented model or algorithm that generates a user interface for responding to a query. For instance, an interface orchestrator can refer to a computer-implemented model or algorithm that generates a user interface in response to a query using one or more content modules. To illustrate, an interface orchestrator can generate a user interface to include a content module (e.g., to include one or more interface elements corresponding to the content module) based on a content module score determined for the content module. In some cases, the interface orchestrator further generates the user interface based on additional factors, such as the query medium or the client device through which the user interface is to be displayed.

Further, as mentioned, some embodiments of the interface module configuration system 100 use one or more large language models to respond to queries. As used herein, the term "large language model" (or "LLM") refers to a computer-implemented machine learning model trained to comprehend and generate human language text. In particular, a large language model can refer to a neural network (e.g., a deep neural network) with many parameters trained on large quantities of data (e.g., unlabeled text) using a particular learning technique (e.g., self-supervised learning). For example, in some cases, a large language model includes a neural network having parameters trained to generate natural language text output from natural language text input. In some cases, however, a large language model can generate an output that is computer-based. For instance, in some embodiments, a large language model can generate computer code, pseudo code, or other output that is interpretable by computers and/or computer systems. To illustrate, a large language model can generate a tool call (e.g., an API call) that is interpretable by a computer-implemented tool and/or a computer-implemented system upon which the computer-implemented tool operates. Indeed, in some instances, a large language model generates output that is particular to (e.g., formatted for) a particular computer-implemented system (e.g., a computer application). Further, a large language model can generate a prompt for another computer-implemented model, such as another large language model. In some cases, a large language model implements a deep transformer neural network architecture.

Figure 2A:
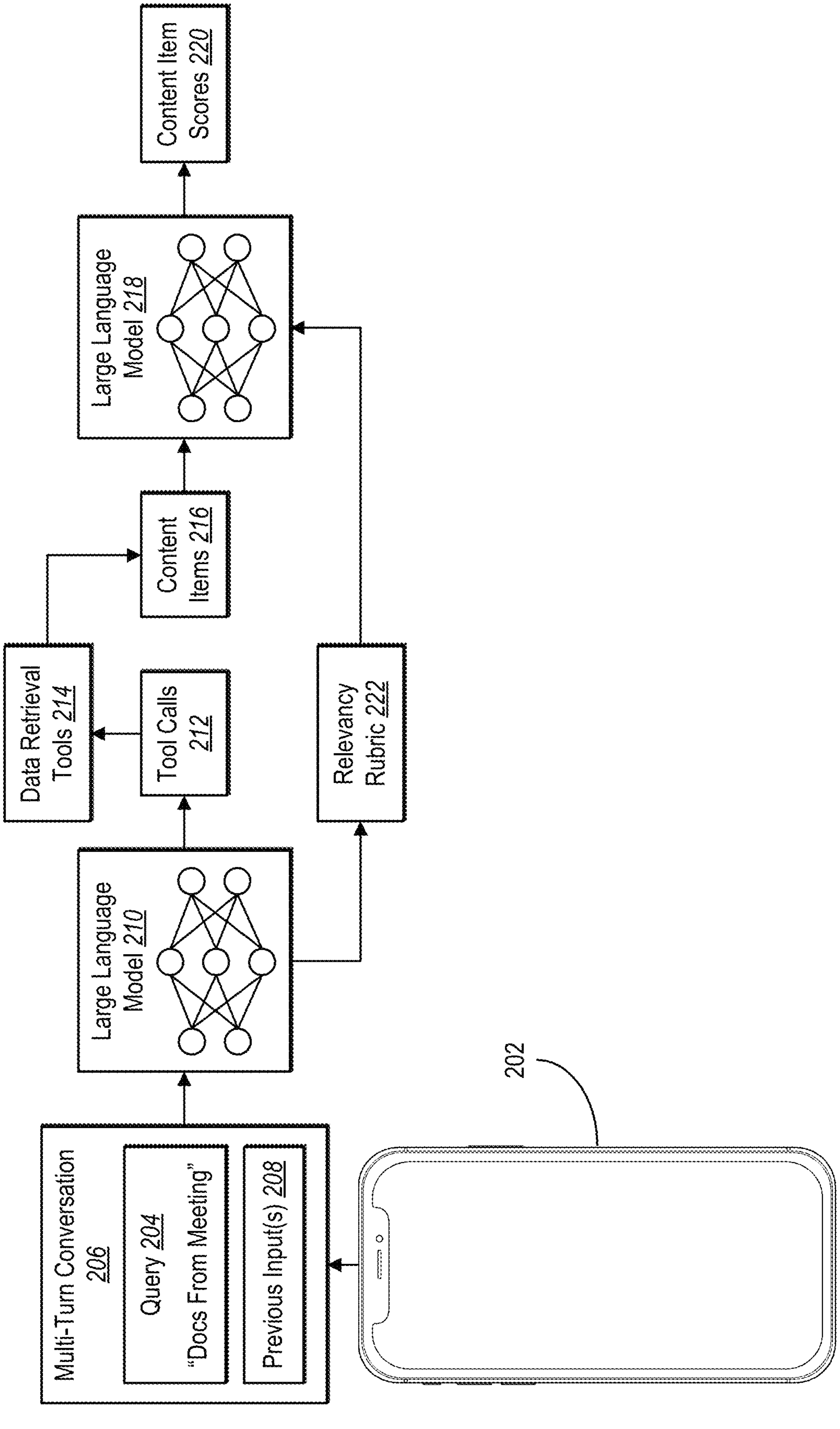
FIGS. 2A-2B illustrate generating a user interface in response to a query using content item scores and content module scores in accordance with one or more embodiments.
Figure 2B:
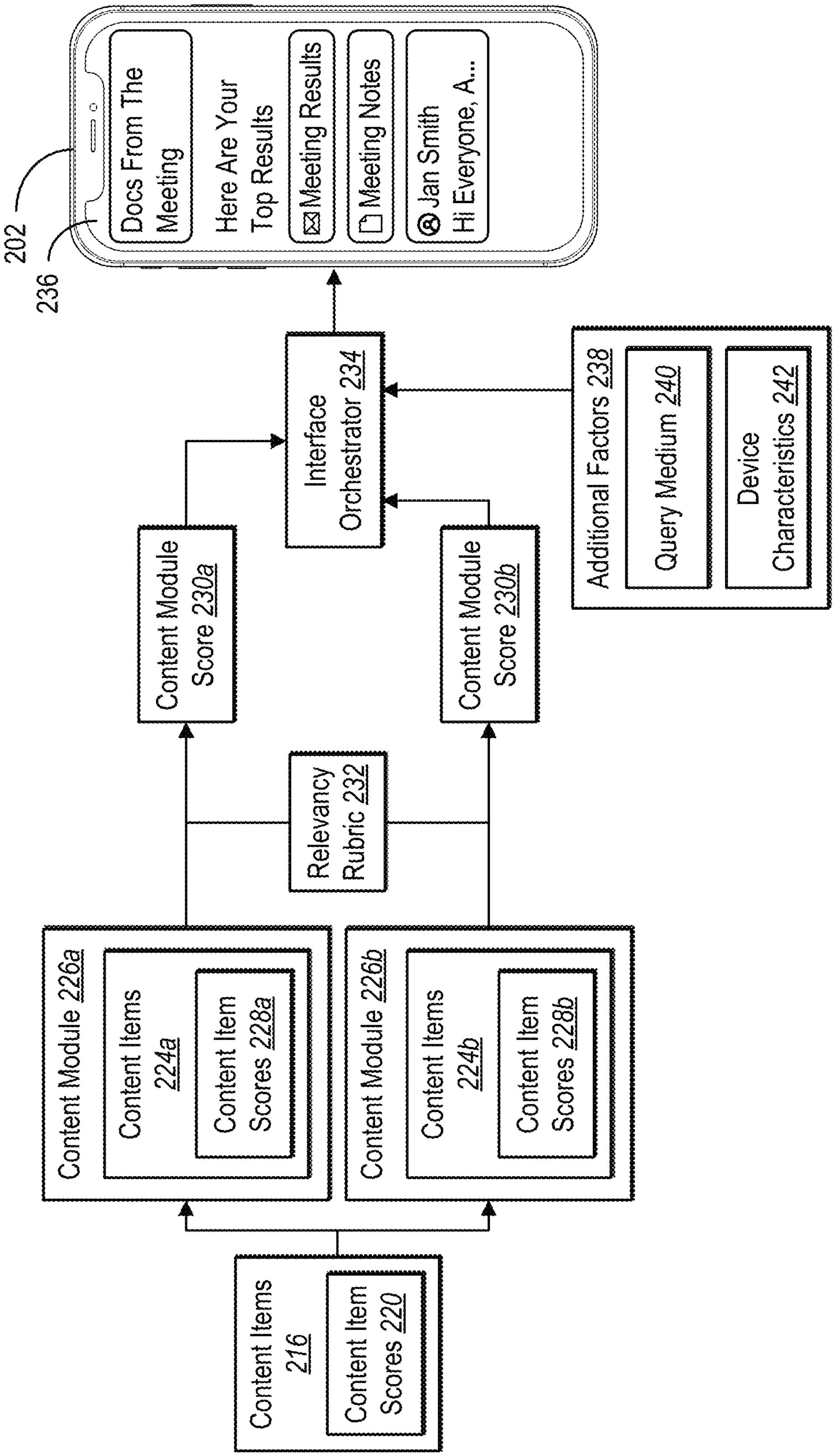

As mentioned, the interface module configuration system 100 can determine scores for content items and modules indicating their relevance to a received query. The interface module configuration system 100 can further generate a user interface in response the query based on the determined scores. FIGS. 2A-2B illustrate the interface module configuration system 100 generating a user interface in response to a query using content item scores and content module scores in accordance with one or more embodiments.

In particular, FIG. 2A illustrates the interface module configuration system 100 determining content item scores for content items obtained in response to a query in accordance with one or more embodiments. As shown in FIG. 2A, the interface module configuration system 100 receives a query 204 from a client device 202. The query 204 is part of a multi-turn conversation 206 that also includes one or more previous client device inputs 208 (e.g., one or more previous queries, statements, and/or selections). Indeed, in some cases, the interface module configuration system 100 receives a query that is part of a sequence of client device inputs. Thus, the query 204 received from the client device 202 can include a client device input received after an initial client device input that begins the sequence. In some embodiments, however, the query 204 includes an isolated client device input or an initial client device input that is the start of a multi-turn conversation.

As further shown, the interface module configuration system 100 uses a first large language model 210 to generate tool calls 212 from the query 204. In one or more embodiments, the interface module configuration system 100 uses the first large language model 210 to generate the tool calls 212 from the query 204 alone. In some embodiments, however, the interface module configuration system 100 uses the first large language model 210 to generate the tool calls 212 based on additional factors. For instance, the interface module configuration system 100 can generate the tool calls 212 based on the one or more previous client device inputs 208, a user profile associated with the client device 202, and/or user preferences associated with the client device 202. Indeed, in some cases, the interface module configuration system 100 determines a context that corresponds to the query 204 (e.g., a context including previous inputs, a user profile, user preferences, and/or other factors) and uses the first large language model 210 to generate the tool calls 212 based on the query 204 and the corresponding context. In some cases, the interface module configuration system 100 uses the query 204 and/or the corresponding context to generate a large language model prompt that is provided to the first large language model 210 for the generation of the tool calls 212.

As indicated, the interface module configuration system 100 uses the first large language model 210 to generate the tool calls 212 for data retrieval tools 214. For instance, the interface module configuration system 100 can generate a tool call for each data retrieval tool to be used in retrieving content items in response to the query 204.

In one or more embodiments, each of the data retrieval tools 214 operates as part of the interface module configuration system 100. In other words, the interface module configuration system 100 can implement the data retrieval tools 214 using the tool calls 212. In some embodiments, however, one or more of the data retrieval tools 214 are external to the interface module configuration system 100. For instance, one or more of the data retrieval tools 214 can operate on a third-party system. Thus, in some cases, the interface module configuration system 100 provides a tool call to the third-party system of the corresponding data retrieval tool (e.g., as an API call) to request use of the data retrieval tool in retrieving one or more content item.

As illustrated, the interface module configuration system 100 receives, accesses, retrieves, or otherwise obtains content items 216 via the data retrieval tools 214 based on the tool calls 212. For instance, the interface module configuration system 100 can obtain a set of one or more content items via each of the data retrieval tools 214. In some cases, the interface module configuration system 100 obtains content items of a different content type via each of the data retrieval tools 214. To illustrate, the interface module configuration system 100 can obtain digital text files via a first data retrieval tool, digital images via a second data retrieval tool, email messages via a third data retrieval tool, and contacts via a fourth data retrieval tool.

As further illustrated, the interface module configuration system 100 uses a second large language model 218 to generate content item scores 220 for the content items 216. In particular, the interface module configuration system 100 uses the second large language model 218 to generate a content item score for each content item obtained via the data retrieval tools 214. For instance, the interface module configuration system 100 can use the second large language model 218 to analyze a relevance of a content item to the query 204 and generate a content item score for the content item based on the analysis. In some cases, the second large language model 218 determines relevance based on the subject matter of the content item. In some embodiments, the second large language model 218 considers additional factors.

To illustrate, when analyzing a digital image obtained via an image retrieval tool, the second large language model 218 can consider whether the digital image portrays content requested by the query 204. Further, the second large language model 218 can consider additional factors of the digital image, such as size, blurriness, formatting, whether the image has been cropped, color palette, or brightness. To provide another illustration, when analyzing a digital text document via a text retrieval tool, the second large language model 218 can consider whether the text content corresponds to subject matter requested by the query 204 but can also consider additional factors, such as length, language, or factual accuracy.

As shown in FIG. 2A, the interface module configuration system 100 uses the second large language model 218 to generate the content item scores 220 based on a relevancy rubric 222. In particularly, the interface module configuration system 100 uses the first large language model 210 to generate the relevancy rubric 222 and provides the relevancy rubric 222 to the second large language model 218 for evaluation of the content items 216.

To illustrate, in some cases, the interface module configuration system 100 generates a large language model prompt that is provided to the second large language model 218 for evaluation of the content items 216. The interface module configuration system 100 can generate the large language model prompt from the relevancy rubric 222 and/or each of the content items 216. In some cases, the interface module configuration system 100 generates a separate large language model prompt for each content item or each content type. Further, in some cases, the interface module configuration system 100 generates a separate relevancy rubric for each content item or each content type. In some implementations, however, the interface module configuration system 100 uses the relevancy rubric 222 to indicate factors of relevancy for multiple content types. Thus, in some instances, the interface module configuration system 100 uses the same prompt (e.g., having the relevancy rubric 222) for evaluation of each content item.

In one or more embodiments, the interface module configuration system 100 uses the first large language model 210 to generate the relevancy rubric 222 based on an understanding of the query 204. In some cases, the interface module configuration system 100 uses the first large language model 210 to generate the relevancy rubric 222 from the query 204 alone. In some embodiments, however, the interface module configuration system 100 uses the first large language model 210 to generate the relevancy rubric 222 based on additional factors, such as a context that corresponds to the query 204.

In certain embodiments, the relevancy rubric 222 indicates factors to consider when determining the relevancy of a content item to the query 204. For instance, the relevancy rubric 222 can indicate that a content item having content that corresponds to subject matter requested by the query 204 is more relevant than a content item that does not contain such content. Thus, the interface module configuration system 100 can determine a content item score for a content item based on the content of the content item (e.g., whether a digital text file includes keywords from the query 204 or whether a digital image depicts subject matter indicated by the query 204). To illustrate, in some cases, the interface module configuration system 100 determines (e.g., via the first large language model 210) a classification for the query 204 and determines whether an obtained content item has the same classification.

The relevancy rubric 222 can further indicate that a content item having certain additional factors is more relevant than a content item that does not include such factors. Therefore, the interface module configuration system 100 can determine a content item score for a content item based on the presence (or lack thereof) of the additional factors indicated by the relevancy rubric 222. In some cases, the additional factors are specific to a content type. Indeed, as previously mentioned, the interface module configuration system 100 can generate a separate relevancy rubric for each content type or can generate the relevancy rubric 222 to indicate factors of relevancy for multiple content types. Thus, the interface module configuration system 100 can generate each relevancy rubric to address additional factors associated with the corresponding content type (e.g., image factors for digital images or text content factors for digital text documents).

Thus, in certain embodiments, the interface module configuration system 100 provides a content item from the content items 216 and the relevancy rubric 222 (e.g., as part of a large language model prompt) to the second large language model 218. The interface module configuration system 100 uses the second large language model 218 to generate a content item score for the content item in accordance with the relevancy rubric. By incorporating the relevancy rubric 222 into the scoring process, the interface module configuration system 100 ensures that content items are scored based on an understanding of the query 204 and its surrounding context.

FIG. 2B illustrates the interface module configuration system 100 generating a user interface in response to a query based on content modules scores in accordance with one or more embodiments. As shown in FIG. 2B, the interface module configuration system 100 determines content module scores using the content items 216 and the content item scores 220 discussed above with reference to FIG. 2A.

For instance, FIG. 2B shows that the interface module configuration system 100 determines, from the content items 216, a first set of content items 224*a* that correspond to a first content module 226*a* and a second set of content items 224*b* that correspond to a second content module 226*b*. As shown, the first set of content items 224*a* are associated with a first set of content item scores 228*a* from the content item scores 220, and the second set of content items 224*b* are associated with the second set of content item scores 228*b* from the content item scores 220. Though FIG. 2B indicates multiple content items (and their content item scores) corresponding to each content module, only one content item can correspond to a content module in some cases. Each of the content modules 226*a*-226*b* can correspond to one or more content types.

Thus, each of the sets of content items 224*a*-224*b* can include content items of one or more content types. As will be explained further below, the interface module configuration system 100 can use various content modules that incorporate the corresponding content items via various approaches. For instance, some content modules list the corresponding content items (e.g., include interface elements that indicate the corresponding content items), some content modules display the corresponding content items (e.g., display the content included therein), and other content modules include content generated from the corresponding content items (e.g., an answer to a question included in the query 204 that is derived from the content of the content items).

In one or more embodiments, the interface module configuration system 100 generates each of the content modules 226*a*-226*b* for evaluation. In some embodiments, the interface module configuration system 100 does not generate the content modules 226*a*-226*b* before their evaluation; rather, the interface module configuration system 100 evaluates the content modules 226*a*-226*b* based on an understanding of what their configuration would be upon their generation. Indeed, as will be described more below, the interface module configuration system 100 can use content modules that are standard yet configurable. Thus, in some cases, the interface module configuration system 100 can predict the content and format of a content module upon its generation using its corresponding content items. In certain implementations, the interface module configuration system 100 evaluates content modules without generating the content modules to avoid consuming resources in generating content modules that are potentially not used in the user interface provided in response to the query 204.

As shown in FIG. 2B, the interface module configuration system 100 determines a first content module score 230*a* for the first content module 226*a* and determines a second content module score 230*b* for the second content module 226*b*. Further, as shown, the interface module configuration system 100 determines the first content module score 230*a* and the second content module score 230*b* using a relevancy rubric 232. In one or more embodiments, the interface module configuration system 100 generates the relevancy rubric 232 based on the query 204 and/or a corresponding context. In some cases, the interface module configuration system 100 uses a standardized rubric that generally indicates measures of relevancy of content modules. In other words, in some cases, the relevancy rubric 232 is not particular to the query 204 but includes general indications of content module relevance. The interface module configuration system 100 can, however, apply the relevancy rubric 232 based on the content item scores of the content items corresponding to each content module, enabling for a determination of relevancy that is particular to the query 204.

To illustrate, in one or more embodiments, the relevancy rubric 232 indicates that a content module having content items with relatively higher content item scores (e.g., higher individual scores, a higher total score or a higher average score) is more relevant than a content module having content items with relatively lower content item scores (e.g., lower individual scores, a lower total score, or a lower average score). Thus, the interface module configuration system 100 can determine a content module score for a content module based on the content item scores for the content items corresponding to the content module. Further, in some embodiments, the relevancy rubric 232 indicates that a content module having at least a threshold number of corresponding content items is more relevant than a content module having a number of corresponding content items below the threshold. As such, the interface module configuration system 100 can determines a content module score for a content module based on the number of corresponding content items.

In some cases, the interface module configuration system 100 uses a separate relevancy rubric for each potential content module. Indeed, as will be discussed, the interface module configuration system 100 can use content modules of various configurations. Thus, the interface module configuration system 100 can use relevancy rubrics that address the particulars of each configuration. In some cases, however, the interface module configuration system 100 uses a single relevancy rubric to score each content module.

As illustrated in FIG. 2B, the interface module configuration system 100 uses an interface orchestrator 234 to generate and provide a user interface 236 for display on the client device 202 based on the content module scores 230*a*-230*b*. In some embodiments, the interface module configuration system 100 uses the interface orchestrator 234 to determine which content modules to include based on their respective content module scores. For instance, the interface module configuration system 100 can use the interface orchestrator 234 to establish a score threshold and determine whether the content module score for a content module satisfies the threshold. Upon determining that the content module score does not satisfy the threshold, the interface module configuration system 100 can omit that content module from the user interface 236. On the other hand, upon determining that the content module score does satisfy the threshold, the interface module configuration system 100 can include the content module.

In some implementations, the interface module configuration system 100 uses the interface orchestrator 234 to determine the top n content module scores and include the corresponding content modules within the user interface 236. For instance, the interface module configuration system 100 can determine to use n content modules when responding to a query to avoid interface clutter. Thus, the interface module configuration system 100 can use the interface orchestrator 234 to compare content module scores to identify the top n scores.

In some instances, the interface module configuration system 100 further uses the interface orchestrator 234 to arrange the included content modules within the user interface 236. For instance, via the interface orchestrator 234, the interface module configuration system 100 can determine to present content modules with higher scores nearer the top of the user interface 236 or to present those content modules larger within the user interface 236.

As illustrated in FIG. 2B, the interface module configuration system 100 can also consider additional factors 238 when using the interface orchestrator 234 to generate the user interface 236. For instance, the interface module configuration system 100 can consider the query medium 240 through which the user interface 236 is to be presented and/or the device characteristics 242 of the client device 202. For example, in some cases, the interface module configuration system 100 determines to use fewer content modules when generating user interfaces for smartphones compared user interfaces for tablets, laptops, or desktops due to the relatively limited amount of screen space available. Additionally, the interface module configuration system 100 can determine that a search interface is better suited for content modules that present lists of corresponding content items or that a chat interface is better suited for content modules having brief text responses or links to corresponding content items. Thus, the interface module configuration system 100 can select and arrange content modules for presentation.

In one or more embodiments, the interface module configuration system 100 generates the user interface 236 by generating (and arranging) one or more interface elements corresponding to the content modules included in the user interface 236. The interface module configuration system 100 can use the interface orchestrator 234 to generate the interface element(s) or use one or more other components and/or models. For instance, in some cases, the interface module configuration system 100 uses the interface orchestrator 234 to determine which content modules to include, generates the corresponding interface elements using other components or models, and provides the interface elements to the interface orchestrator 234 for arrangement and generation of the resulting user interface. In some cases, the interface module configuration system 100 uses the interface orchestrator 234 to employ the other components or models to generate the interface elements. In some instances, the interface module configuration system 100 determines the content modules to include and generates the corresponding interface elements without using the interface orchestrator 234 and provides the interface elements to the interface orchestrator 234 for generating the resulting user interface.

To illustrate generating interface elements, where a content module includes generated text content (e.g., text content containing an answer to a question asked via the query 204), the interface module configuration system 100 generates an interface element for the text content. In some cases, the interface module configuration system 100 generates the text content based on the one or more content items corresponding to the content module. For instance, the interface module configuration system 100 can generate the text content by summarizing or describing the content of the one or more corresponding content items. In some instances, the interface module configuration system 100 uses a model, such as a large language model, to generate the text content (e.g., based on an analysis of the one or more corresponding content items). As another example, where a content module includes a list of the corresponding content items, the interface module configuration system 100 generates the list to include indications (e.g., links or attachments) of the content items as well as buttons or checkboxes for selecting the content items for further consideration.

In some cases, the interface module configuration system 100 uses a large language model to generate the user interface 236. For example, in some instances, the interface orchestrator 234 includes a large language model that determines which content modules to include, generates the corresponding interface elements, and/or arranges the content modules (i.e., the interface elements) for display on the client device 202.

Though not shown in FIG. 2B, in some cases, the interface module configuration system 100 generates multiple user interfaces of various configurations and scores the user interfaces. For instance, the interface module configuration system 100 can determine a relevancy score for each user interface to determine how well each user interface responds to the query 204. In some instances, the interface module configuration system 100 uses another relevancy rubric to score the user interfaces. Thus, the interface module configuration system 100 can use the scores to select the user interface to provide for presentation via the client device 202.

Thus, the interface module configuration system 100 can configure the user interface 236 to be responsive to the query 204. Further, the interface module configuration system 100 can configure the user interface 236 can configure the user interface 236 to include content modules determined to be relevant to the query 204. In some cases, the interface module configuration system 100 includes those content modules that are more relevant that other available content modules. In particular, the interface module configuration system 100 can include content modules that are relevant due to the relevance of their corresponding content items.

By implementing a flexible approach to configuring user interfaces differently for different queries, the interface module configuration system 100 can operate more accurately when compared to existing systems. Indeed, the interface module configuration system 100 implements an approach that free from the rigid formats implemented by many existing systems, in which irrelevant content may be included. Further, by including content modules based on their determined relevancy, the interface module configuration system 100 generates responses that overall address queries more accurately.

Figure 3A:
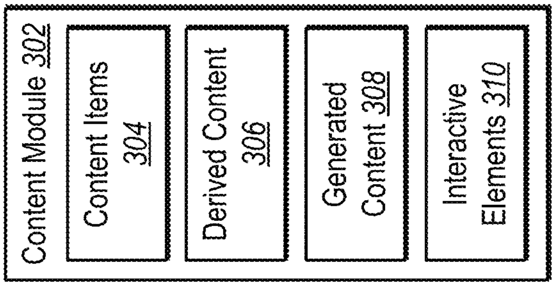
FIGS. 3A-3G illustrate example content modules used by the interface module configuration system in accordance with one or more embodiments.

As mentioned, the interface module configuration system 100 can use various content modules in responding to a query. FIGS. 3A-3G illustrate content modules used by the interface module configuration system 100 in accordance with one or more embodiments. In particular, FIG. 3A illustrates an overview of a content module in accordance with one or more embodiments.

FIGS. 3B-3G illustrate example content modules used by the interface module configuration system 100 in accordance with one or more embodiments.

Indeed, FIG. 3A illustrates a content module 302 that can be used by the interface module configuration system 100. FIG. 3A further illustrates potential components of the content module 302. In other words, FIG. 3A shows user interface elements that could be included in a content module used by the interface module configuration system 100. As previously mentioned, the interface module configuration system 100 can use content modules of various configurations. Therefore, each content module used by the interface module configuration system 100 can include one or more of the components shown in FIG. 3A.

As shown in FIG. 3A, the content module 302 can include content items 304. In particular, the content module 302 can include the content items obtained in response to a query that correspond to the content module 302. For instance, where a content item includes a digital image, the interface module configuration system 100 can include the digital image. In other words, the content module 302 can include a display of the digital image.

Additionally, as shown, the content module 302 can include derived content 306. In some cases, the derived content 306 includes content extracted from one or more content items corresponding to the content module 302. For instance, the derived content 306 can include a portion of text content extracted from a digital text document or a list of keywords included therein. As another example, the derived content 306 can include a thumbnail of a digital image where the thumbnail includes a smaller depiction of the content of the digital images. In some instances, the derived content 306 describes or summarizes one or more content items.

As further shown, the content module 302 can include generated content 308. In some cases, the generated content 308 includes content that is generated regardless of the content items that correspond to the content module 302. For instance, the generated content 308 can include titles, headings, and/or sub-headings. In some instances, the generated content 308 includes content generated based on the one or more corresponding content items. For instance, the generated content 308 can include a consolidated answer to a question posed by a query based on the content of the one or more corresponding content items (suggesting there is some overlap in describing content as derived content or generated content). In some cases, the generated content 308 includes content generated directly in response to a prompt, such as a digital image generated (e.g., using a generative neural network) in response to a prompt included in a query.

As shown in FIG. 3A, the interface module configuration system 100 can also include interactive elements 310. The interactive elements 310 can include various elements that are interactive via a user interface of a client device. Some examples of the interactive elements 310 include buttons, selection lists, media viewers, links, hyperlinks, or content item attachments. In some cases, the interactive elements 310 can include contact information that, when selected, enables the client device to communicate with the corresponding contact via some contact medium (e.g., selection of the phone number enables a smartphone to initiate a phone call with the contact, selection of an email address triggers the opening of an emailing application that enables the client device to draft and send an email message to the contact, or selection of a name or photo of a contact triggers opening of a corresponding social media platform to enable the client device to send a social media message).

Figure 3B:
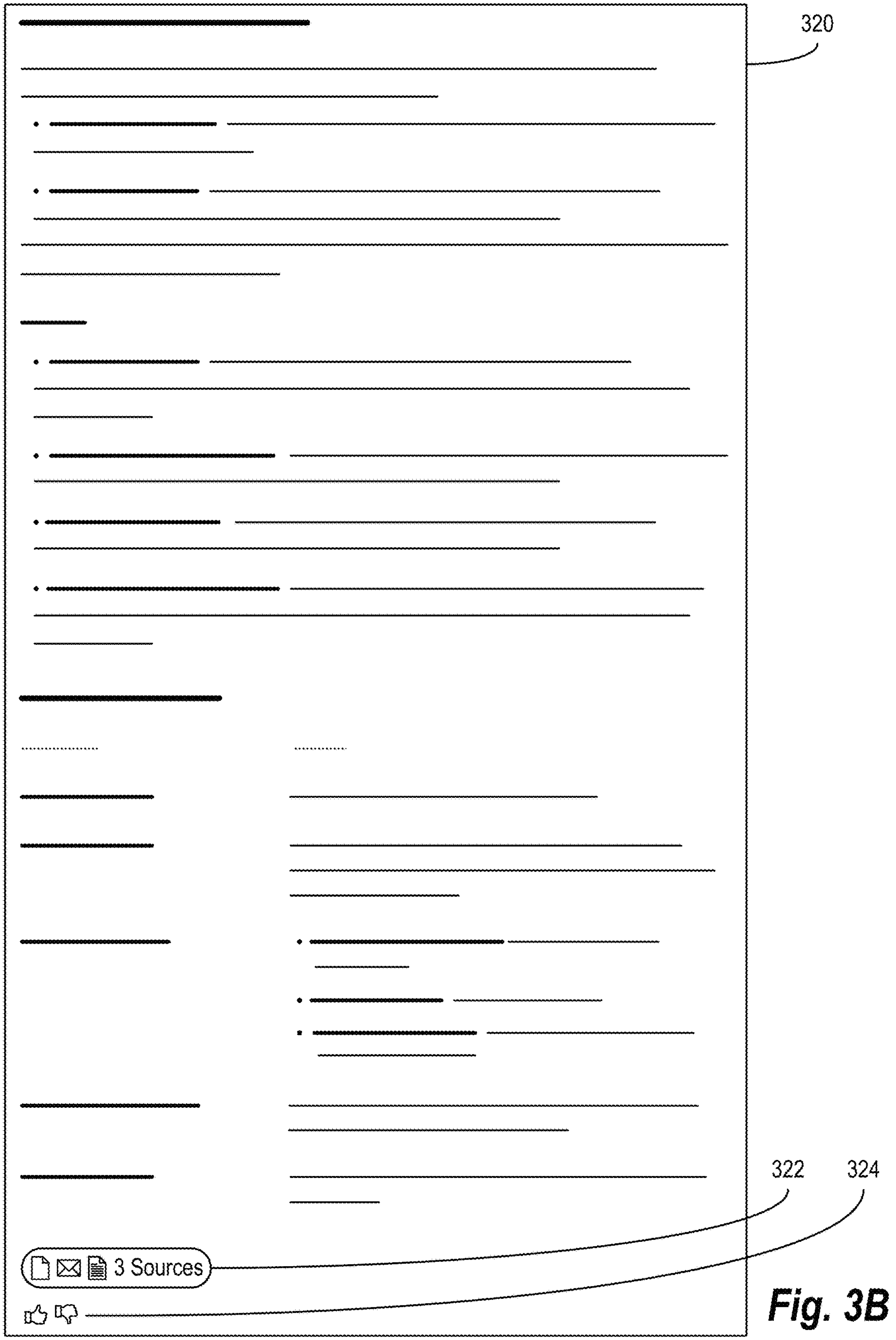

FIG. 3B illustrates an example of a content module 320 that can be used by the interface module configuration system 100. As shown in FIG. 3B, the content module 320 can include derived content and/or generated content. For instance, the content of the content module 320 (e.g., the interface elements) includes text content organized into sections with a title, headings, and sub-headings. The content module 320 further includes a table with some additional information. In one or more embodiments, the content module 320 corresponds to a long-form response to a query as the content module provides a significant amount of information. In some cases, the interface module configuration system 100 uses such a content module when a query is submitted through a large language model or submitted via a client device having sufficient screen space to display the content without the need for a significant amount of scrolling.

Additionally, as shown in FIG. 3B, the content module 320 includes an indication 322 of the content items upon which at least some of the other content is based. In particular, the content module 320 can indicate that the other content is based on particular content items or content items of particular content types. Thus, the interface module configuration system 100 can indicate that the response to the query has support within relevant content items.

Further, FIG. 3B shows that the content module 320 includes feedback elements 324. For instance, the content module 320 includes at least a positive feedback element and a negative feedback element. Thus, the interface module configuration system 100 enables a client device to indicate whether a query response was helpful or unhelpful.

In some implementations, the interface module configuration system 100 uses feedback regarding a query response for further action. For instance, the interface module configuration system 100 can store the feedback and use the stored feedback to build a context for a conversation or for a client device. To illustrate, based on received feedback, the interface module configuration system 100 can determine whether a client device prefers some content modules over others. Thus, when generating a response to a query, the interface module configuration system 100 can refer to the preference when determining which content modules to incorporate into the response.

Figure 3C:
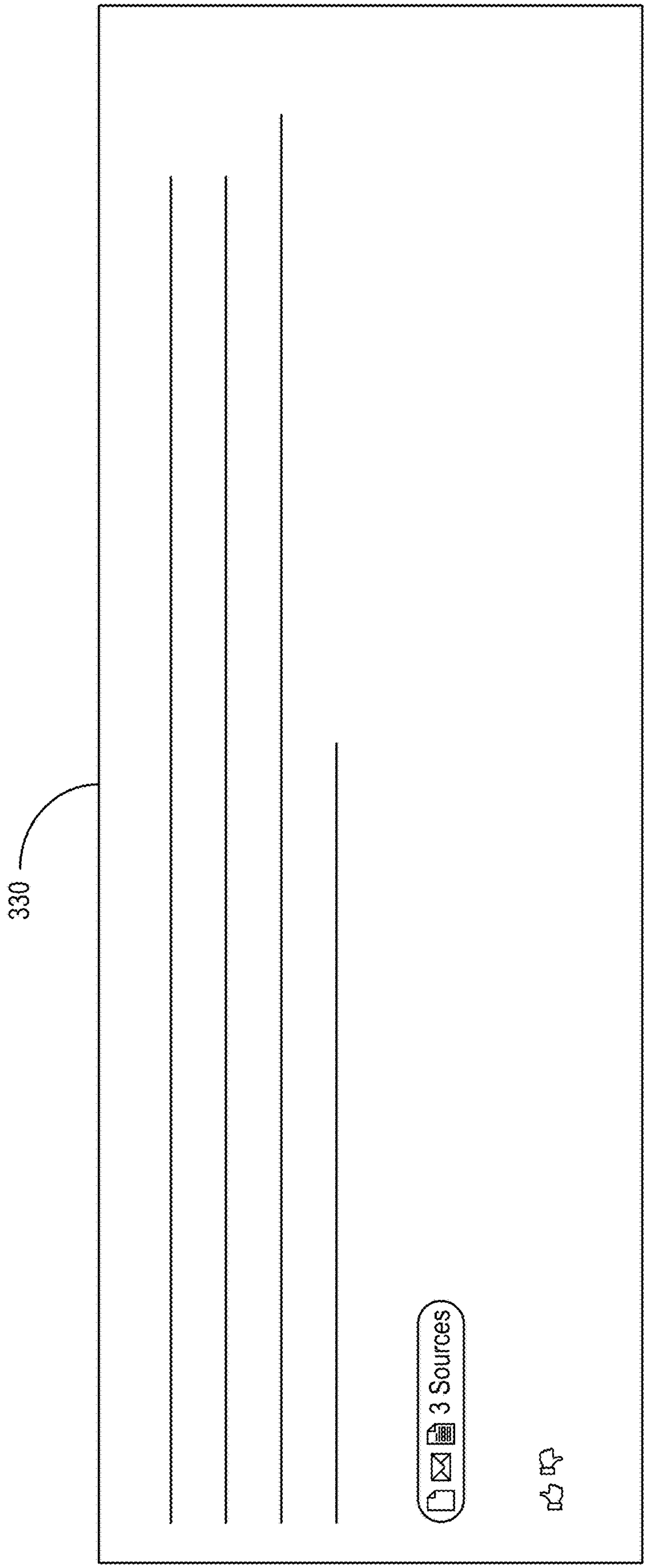

FIG. 3C illustrates another example of a content module 330 that can be used by the interface module configuration system 100. As shown, the content module 330 also includes derived content and/or generated content but in a shorter form than what is provided by the content module 320 of FIG. 3B. Thus, in some cases, the interface module configuration system 100 can determine to use the content module 330 as an alternative to the content module 320. For instance, the interface module configuration system 100 can determine to use the content module 330 when more appropriate for the query medium (e.g., the query medium is a chat interface and the interface module configuration system 100 determines a long form response would be inappropriate or burdensome), when the client device has a small amount of available display space, or upon determining that the client device prefers short form responses. In some embodiments, however, the interface module configuration system 100 uses both content modules when responding to a query. For example, the interface module configuration system 100 can position the content module 330 at the top of the responding interface to provide a summarized response and position the content module 320 of FIG. 3B beneath to provide a more detailed explanation for the client device to consider.

Figure 3D:
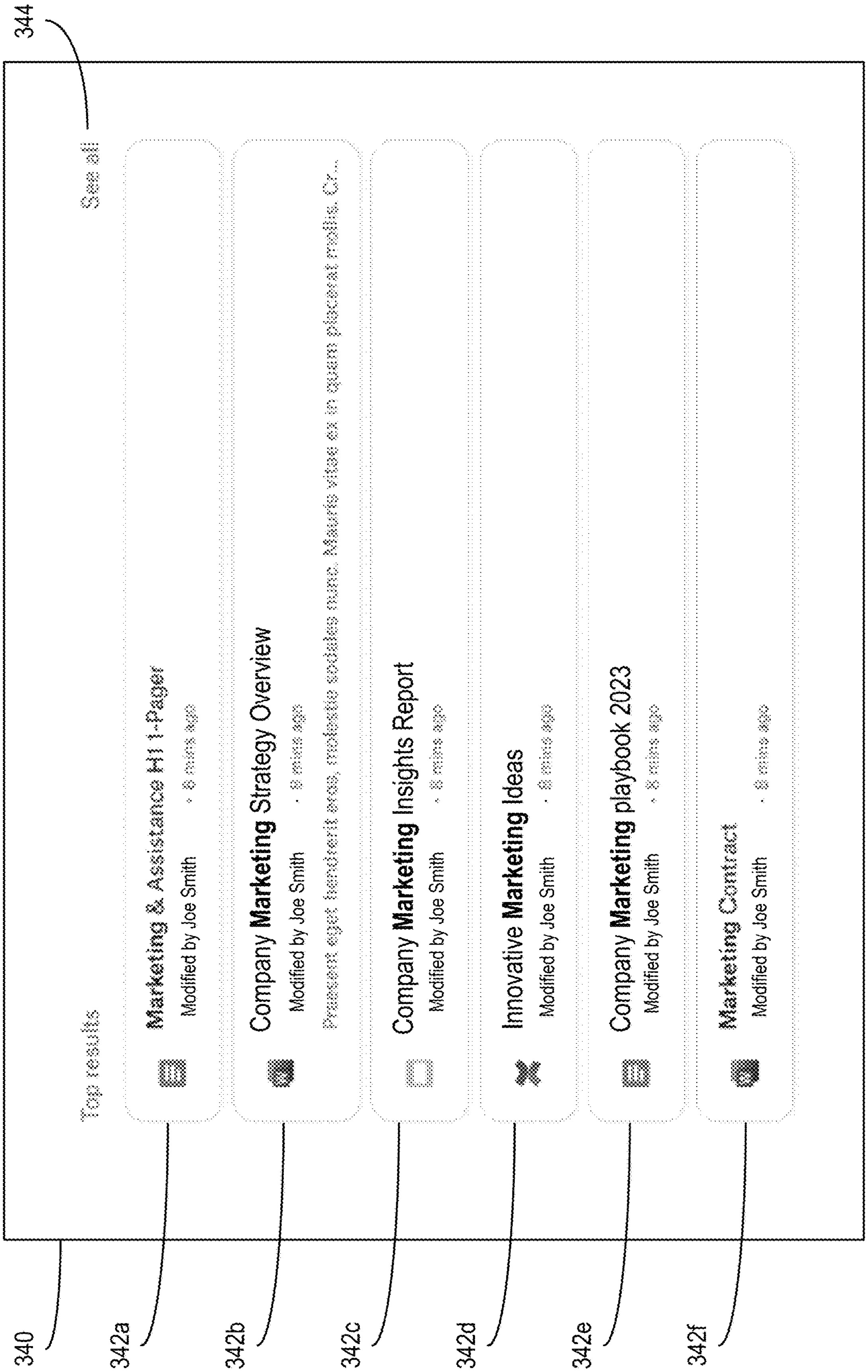

FIG. 3D illustrates another example of a content module 340 that can be used by the interface module configuration system 100. As shown, the content module 340 includes a list of content items. In particular, the content module 340 includes indications 342*a*-342*f* of content items and a heading describing the content items as those determined to be the "top results" (e.g., the most relevant to the query). The indications 342*a*-342*f* can include links to the corresponding content items or content item attachments (e.g., for viewing and/or downloading) As further shown, the content items included in the content module 340 are of various content types. Thus, as mentioned, a content module can correspond to content items of various content types whether the content items were retrieved by the same data retrieval tool or separate data retrieval tools.

Further, as shown in FIG. 3D, the content module 340 includes a selectable option 344 for viewing additional content items. Indeed, in some cases, the content module 340 corresponds to a plurality of content items but the interface module configuration system 100 only shows a subset as the top results. Other content items omitted from the top results, however, can still include content that is relevant to the query. Thus, the interface module configuration system 100 can provide an option for viewing these additional content items. In some cases, upon selection of the selectable option 344, the interface module configuration system 100 expands the list of the content module 340 to include additional indications of the additional content items. In some cases, the interface module configuration system 100 opens a new window that displays the full list of corresponding content items.

Though not shown in FIG. 3D, in some cases, the content module 340 includes an interface element for each content item, such as a checkbox, that indicates a selection of the content item for further consideration. For instance, the interface module configuration system 100 can receive a user interaction with one or more of the checkboxes and modify the appearance of the checkboxes within the user interface (e.g., by adding a check) to indicate the selection. The interface module configuration system 100 can further receive additional client device input, such as a follow-up query, requesting additional information regarding the selected content item(s). In response, the interface module configuration system 100 can generate a response to the follow-up query that includes the additional information (e.g., content derived from or generated based on the content of the selected content item(s)).

In some cases, the interface module configuration system 100 associates each content item provided in the content module 340 with a number. Thus, the interface module configuration system 100 can respond to a follow-up query that indicates the numbers of content items that are to be used in providing the additional information. In some embodiments, the follow-up query identifies selected content items by name or indicates that all content items of a content type are to be used in providing the additional information.

Figure 3E:
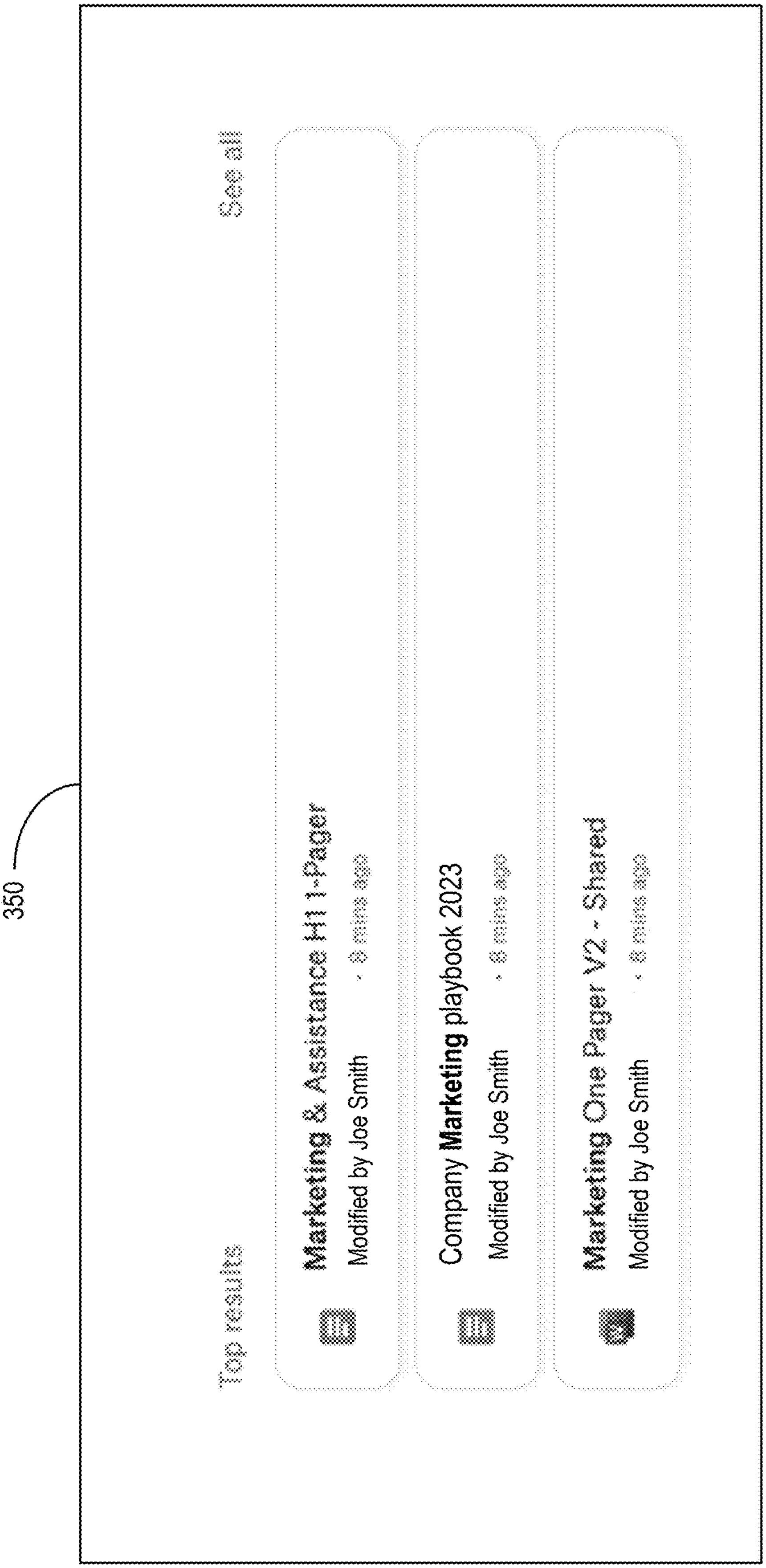

FIG. 3E illustrates another example of a content module 350 that can be used by the interface module configuration system 100. As shown, the content module 350 also includes a list of content items, but the list indicates fewer content items than what is provided by the content module 340 of FIG. 3D. Thus, in some cases, the interface module configuration system 100 can determine to use the content module 350 as an alternative to the content module 340. For instance, the interface module configuration system 100 can use the content module 350 for client devices with a relatively smaller available display space.

Figure 3F:
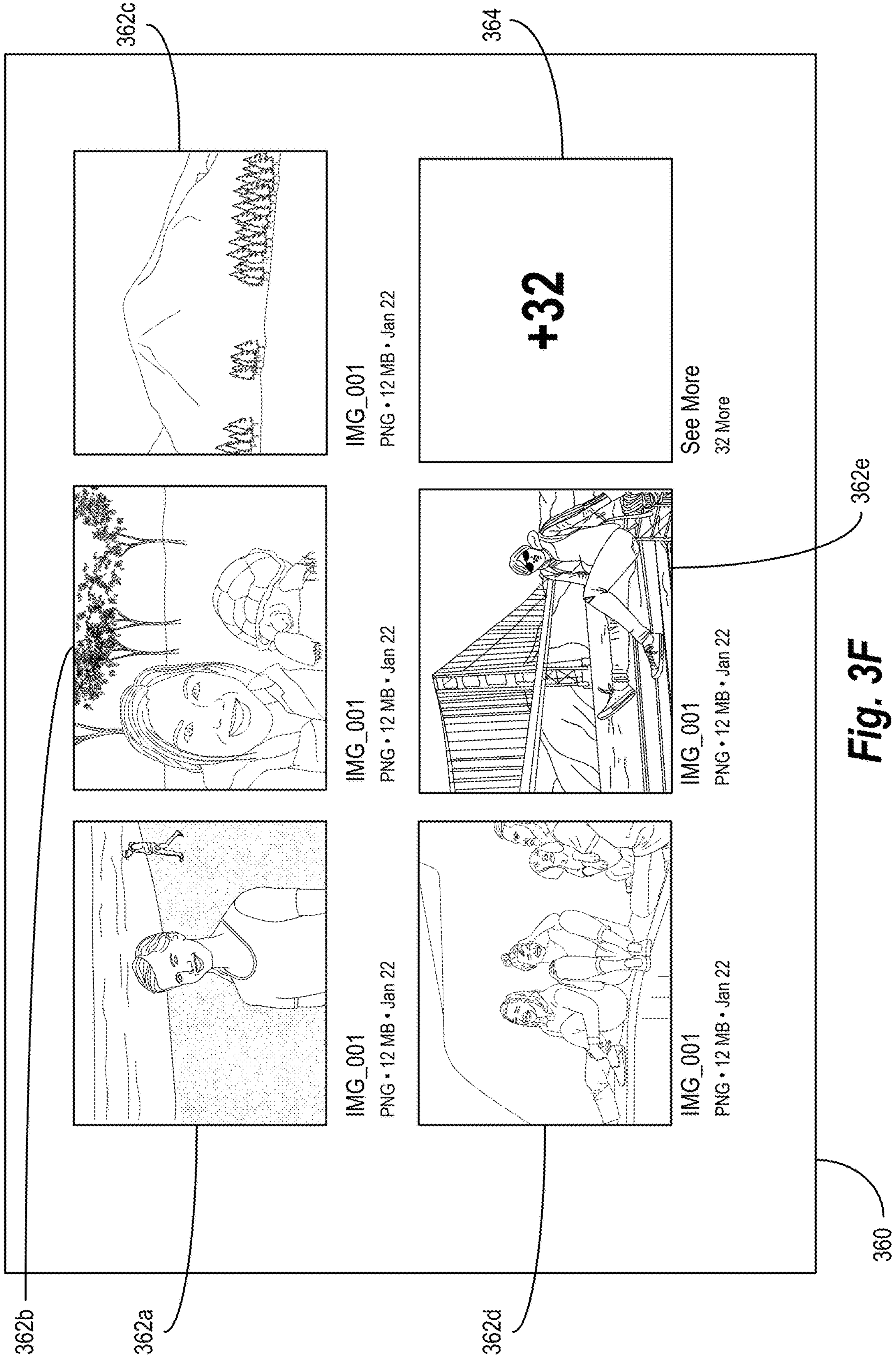

FIG. 3F illustrates yet another example of a content module 360 that can be used by the interface module configuration system 100. As shown, the content module 360 displays the corresponding content items. In particular, as shown, the content module 360 includes media viewers 362*a*-362*e* displaying the content of various content items. The content module 360 further includes a selectable option 364 to view additional content items. For instance, upon detecting a selection of the selectable option 364, the interface module configuration system 100 can add media viewers for one or more additional content items within the content module 360, replace the current content items with additional content items within the media viewers 362*a*-362*e*, or open an additional window that displays the additional content items.

While FIG. 3F illustrates the media viewers 362*a*-362*e* displaying the content of digital images, the media viewers 362*a*-362*e* can display the content of other content types. For instance, the interface module configuration system 100 can use the media viewers 362*a*-362*e* to display digital videos in some cases. Thus, each of the media viewers 362*a*-362*e* can include controls for viewing the corresponding digital video (e.g., controls for pausing or playing the digital video). Additionally, the media viewers 362*a*-362*e* can display text content from corresponding digital text files or controls for listening to corresponding digital audio files. In some cases, each of the media viewers 362*a*-362*e* displays a cropped or reduced-size version of the corresponding content item, and the interface module configuration system 100 provides an expanded or full-size version of the content item upon detecting a selection of its media viewer.

Figure 3G:
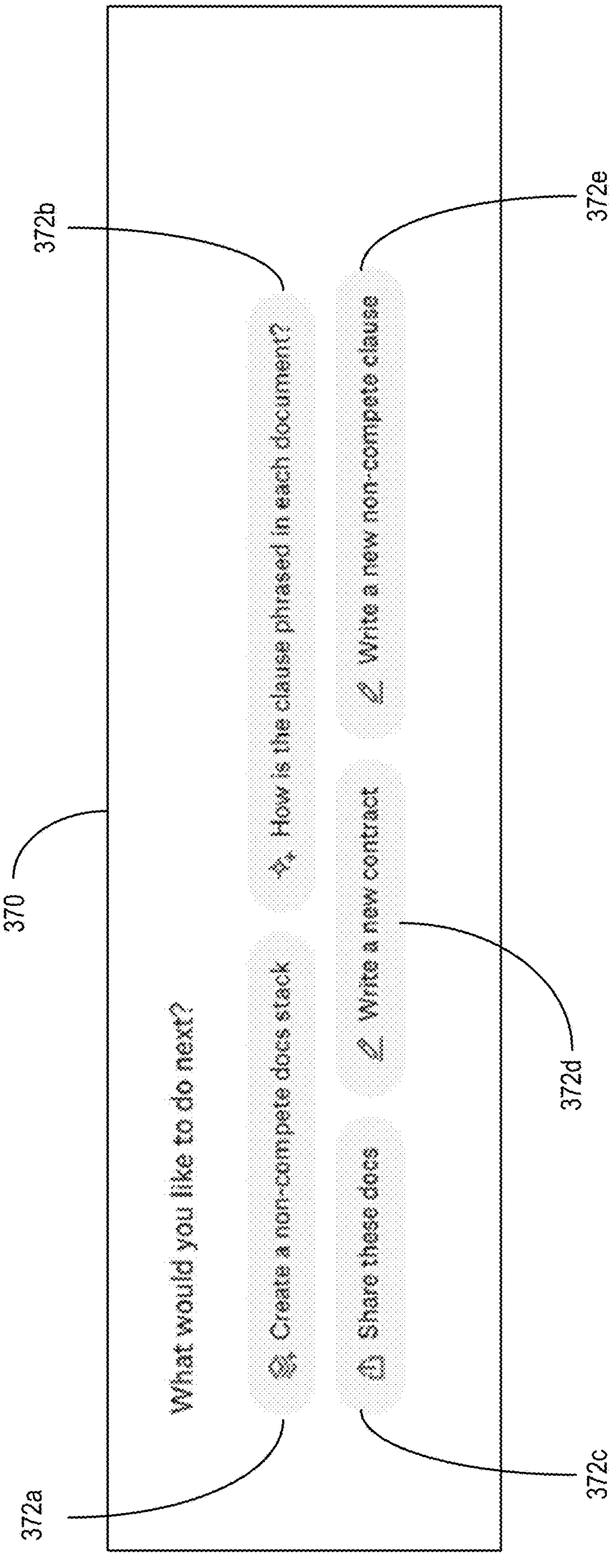

FIG. 3G illustrates yet another example of a content module 370 that can be used by the interface module configuration system 100. As shown, the content module 370 includes selectable options 372*a*-372*e* corresponding to pre-determined optional follow-up queries. Indeed, as previously mentioned, the interface module configuration system 100 can respond to queries that are part of a multi-turn conversation. Thus, the interface module configuration system 100 can provide the content module 370 to facilitate the submission of additional queries. Upon detecting a selection of one of the selectable options 372*a*-372*e*, the interface module configuration system 100 can generate another user interface in response. In some cases, the interface module configuration system 100 incorporates the content module 370 within a user interface along with one or more additional content modules. Thus, the interface module configuration system 100 can respond to a query using one or more other content modules and facilitate continuance of the conversation via the content module 370.

Further, as previously mentioned, the interface module configuration system 100 can incorporate received feedback when subsequently responding to queries. In some cases, the feedback is received via a selection of one of the selectable options 372*a*-372*e* of the content module 370 of FIG. 3G, interaction with one of the feedback elements 324 shown in FIG. 3B, or other client device inputs, such as additional natural language input. As mentioned, in some cases, the interface module configuration system 100 uses received feedback to build a context for the current conversation or for the client device providing the feedback. The interface module configuration system 100 can use the context for subsequent responses, such as by accommodating determined preferences or by using the feedback to improve understanding of subsequent queries.

Additionally, as mentioned, embodiments of the interface module configuration system 100 use data retrieval tools to obtain the content items used in configuring user interfaces in response to queries (e.g., used to determine which content modules to include and to generate interface elements corresponding to the content modules). In some cases, the interface module configuration system 100 uses a one-to-one correspondence between content items retrieved from a data retrieval tool and a content module. In particular, in some embodiments, the interface module configuration system 100 only uses content items retrieved from a particular data retrieval tool for a particular content module.

In some implementations, however, the interface module configuration system 100 does not use such a one-to-one correspondence; rather, the interface module configuration system 100 divides the content items obtained via a data retrieval tool and/or combines content items obtained via multiple data retrieval tools as needed. To illustrate, in some cases, the interface module configuration system 100 uses one data retrieval tool to obtain content items via a keyword search and uses another data retrieval tool to obtain additional content items via a semantic search.

In some cases, the interface module configuration system 100 obtains similar content items via these data retrieval tools (e.g., content items of the same or a related content type). Rather than using these content items for separate content modules, the interface module configuration system 100 can use the collection of content items for the same content module. Further, in some instances, the interface module configuration system 100 obtains content items of different content types from the same data retrieval tool. Thus, the interface module configuration system 100 can divide these content items among multiple content modules where appropriate (e.g., divide digital images and digital text files obtained via the same data retrieval tool).

As mentioned, the interface module configuration system 100 can incorporate one or more content modules within a user interface in responding to a query. In particular, the interface module configuration system 100 generates a user interface by generating one or more interface elements for each content module incorporated. FIGS. 4A-4G illustrate examples user interfaces incorporating content modules in response to queries in accordance with or more embodiments.

Figure 4A:
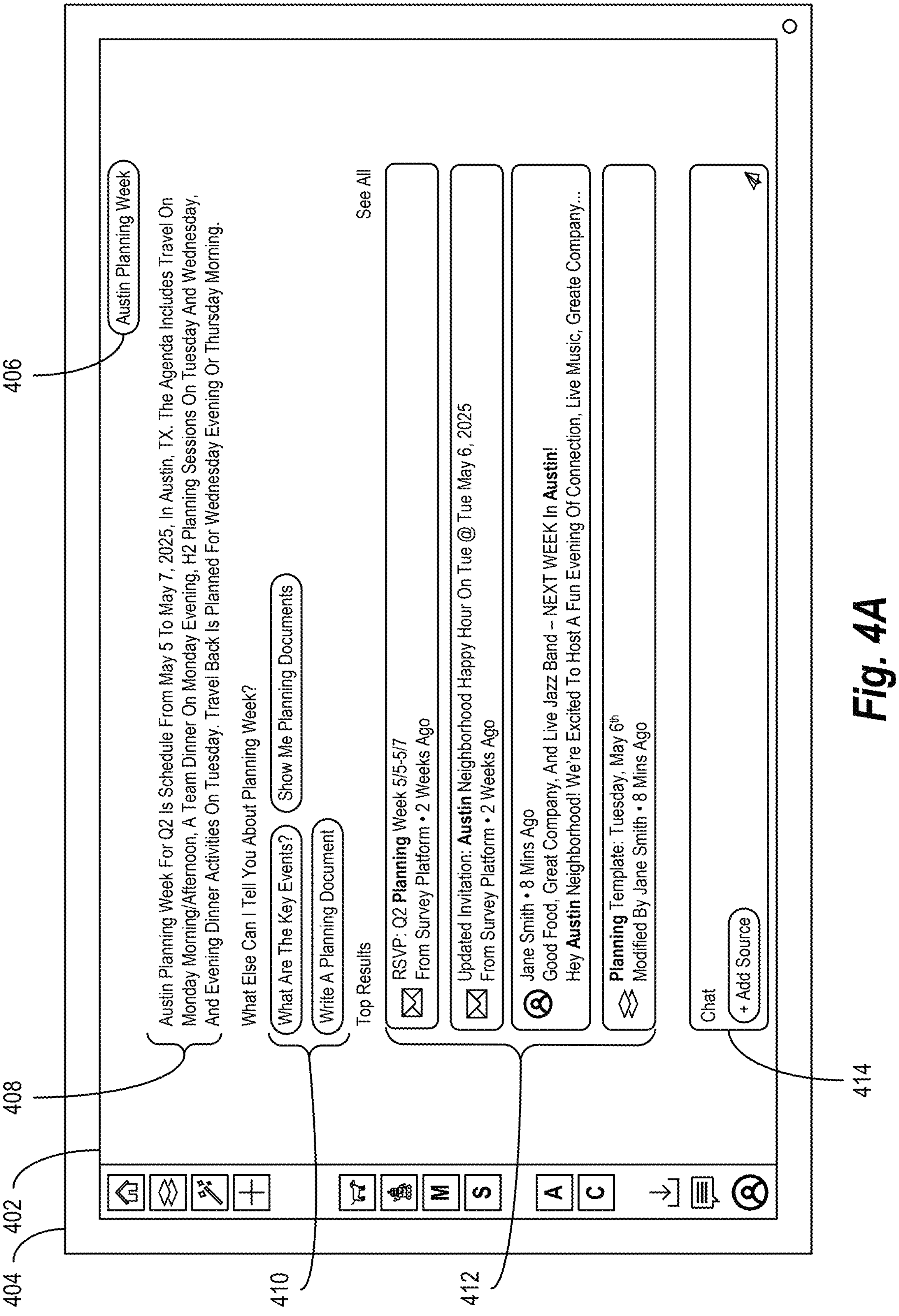
FIGS. 4A-4G illustrate examples user interfaces incorporating various combinations of content modules in response to queries in accordance with or more embodiments.

For instance, FIG. 4A illustrates a graphical user interface 402 displayed by a client device 404 in response to a query 406. As shown, the graphical user interface 402 includes a plurality of interface elements that correspond to a plurality of content modules discussed above. For instance, the graphical user interface 402 includes text content 408 (e.g., from a first content module) that provides a short-form response to the query 406, a set of selectable options 410 (e.g., from a second content module) corresponding to pre-determined optional follow-up queries, and a list of content items 412 (e.g., from a third content module) determined to have relevance to the query 406. Further, the graphical user interface 402 includes a text box 414 for the entry of additional client device input (e.g., a follow-up query). The graphical user interface 402 also includes additional interface elements providing additional information or interactivity.

Figure 4B:
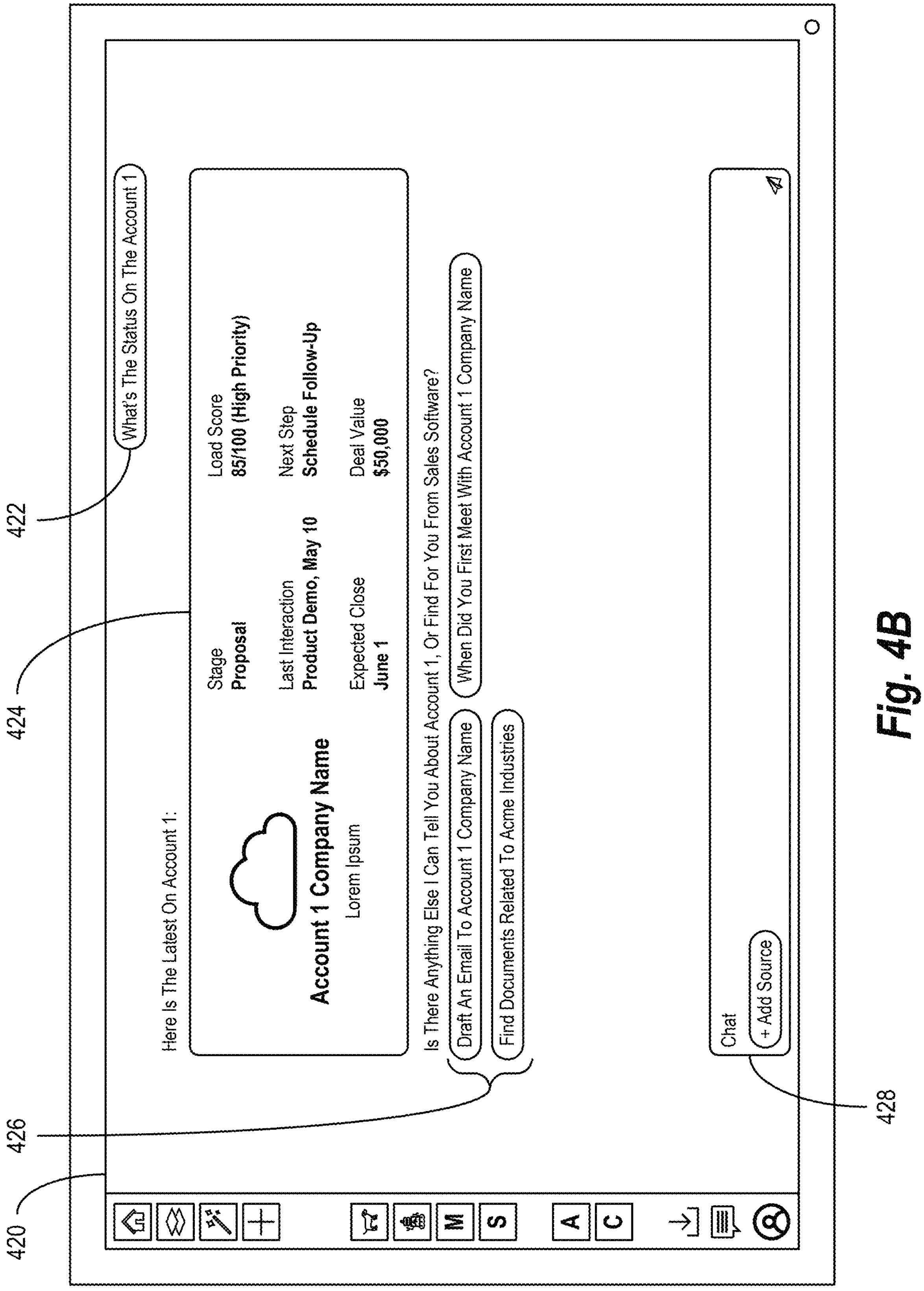

FIG. 4B illustrates, an additional graphical user interface 420 provided in response to a query 422. As shown, the additional graphical user interface 420 includes content 424 summarizing or providing key points regarding the status of an entity as requested by the query 422, a set of selectable options 426 corresponding to pre-determined optional follow-up queries, and a text box 428 for the entry of additional client device input.

Figure 4C:
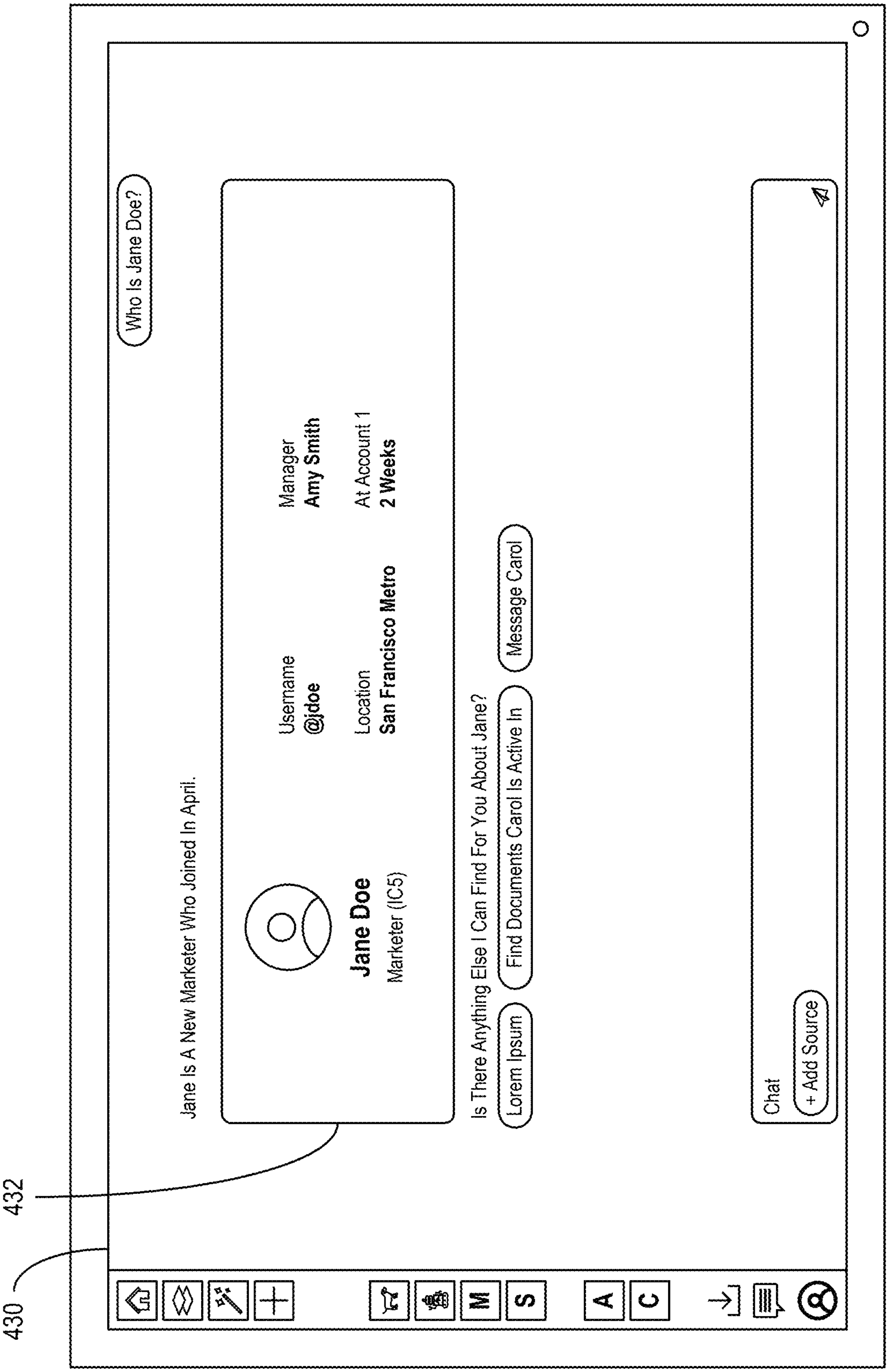

FIG. 4C illustrates another graphical user interface 430. In addition to having interface elements similar to those described above, the graphical user interface 430 includes content 432 providing profile information regarding a particular individual. FIG. 4C illustrates a particular set of information displayed, but the interface module configuration system 100 can vary the profile information displayed in various implementations.

Figure 4D:
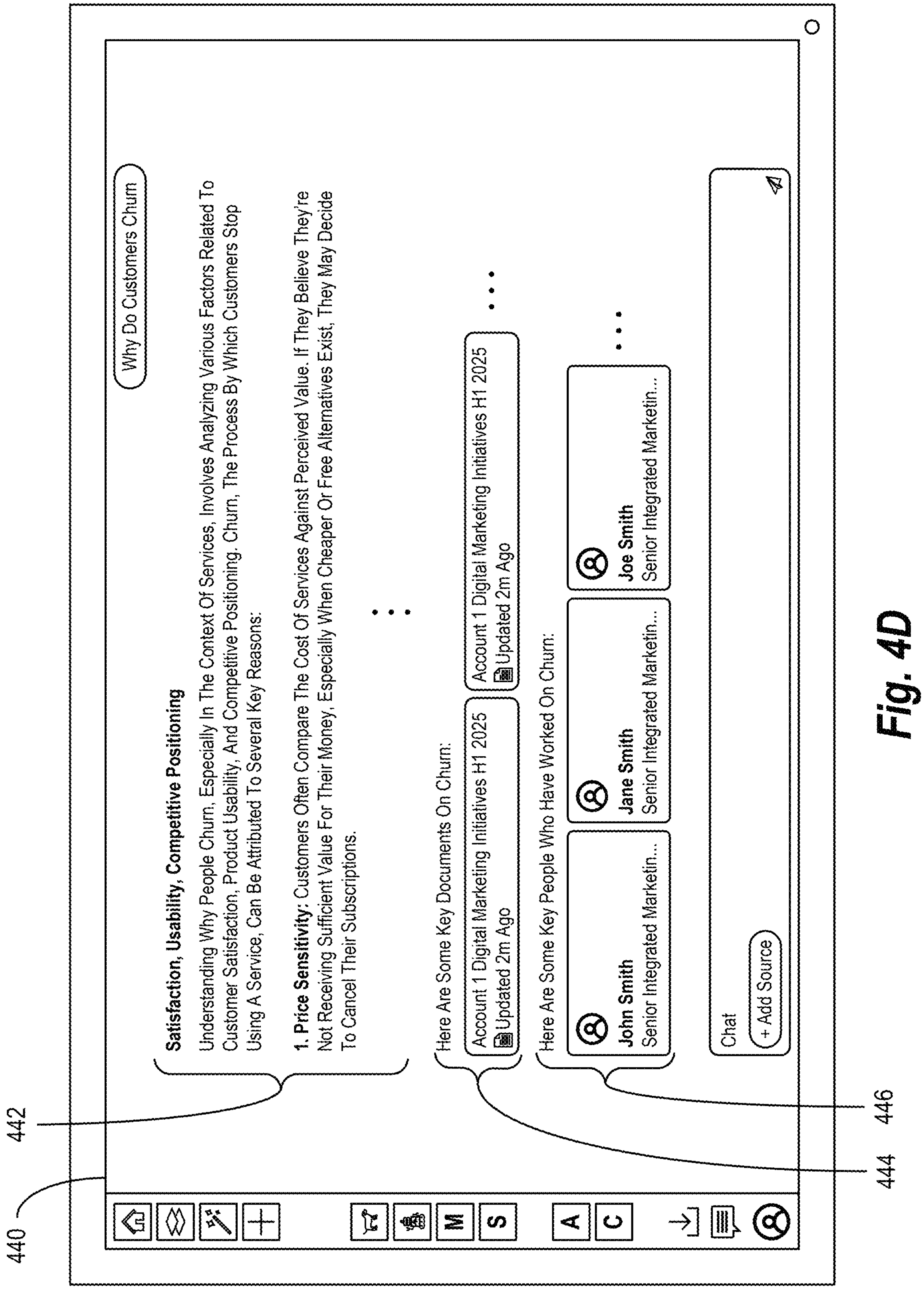
Figure 4E:
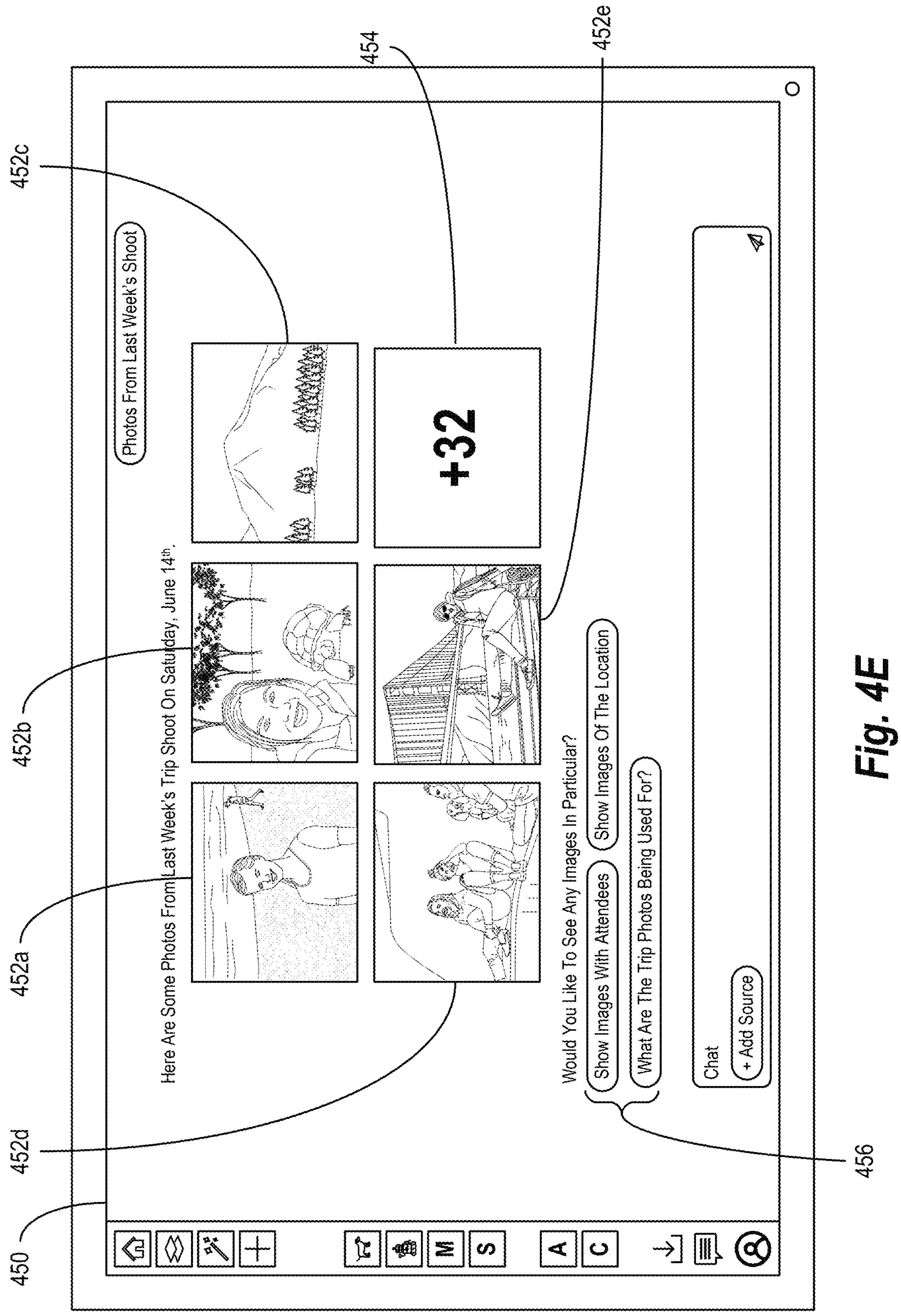
Figure 4F:
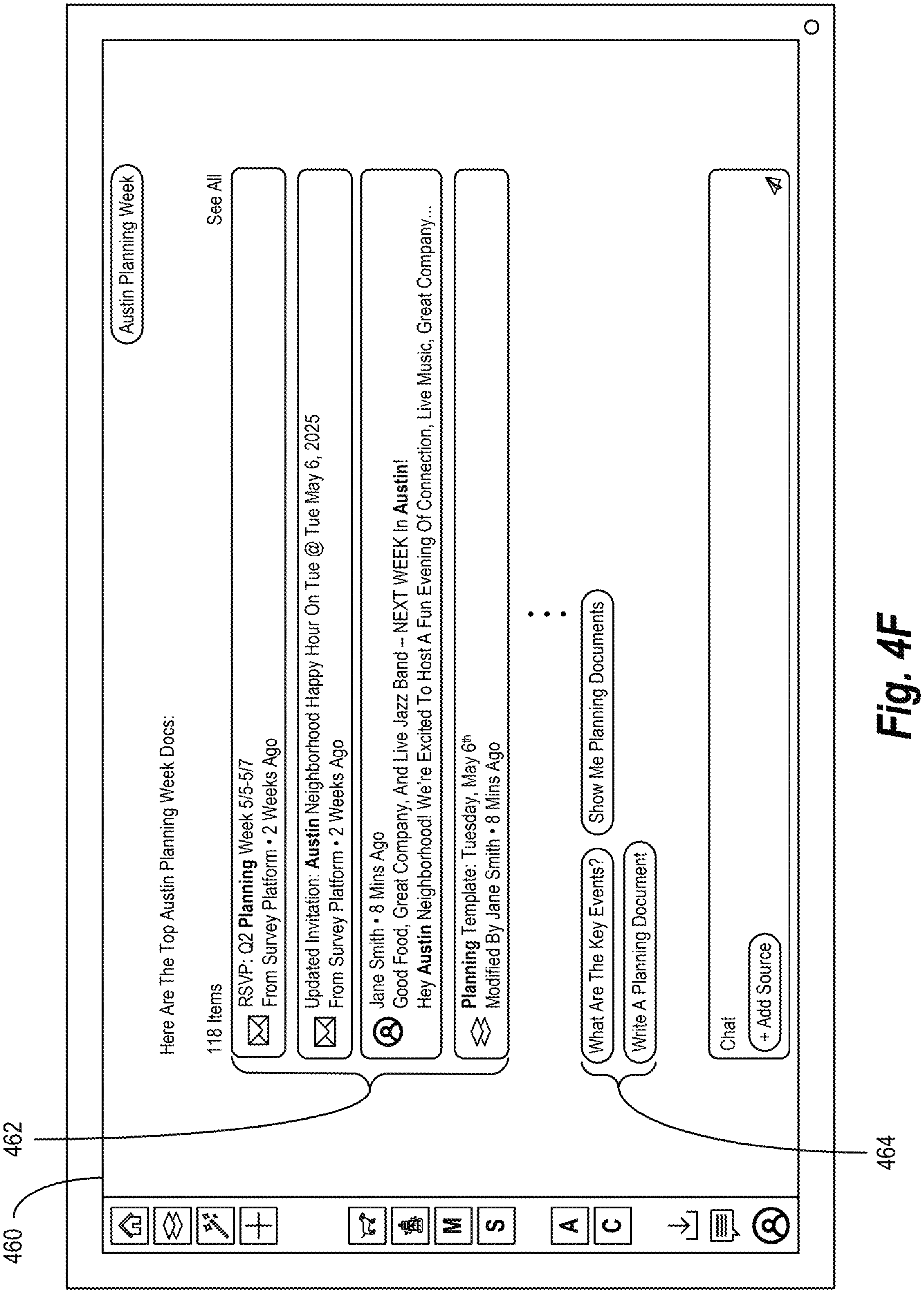
Figure 4G:
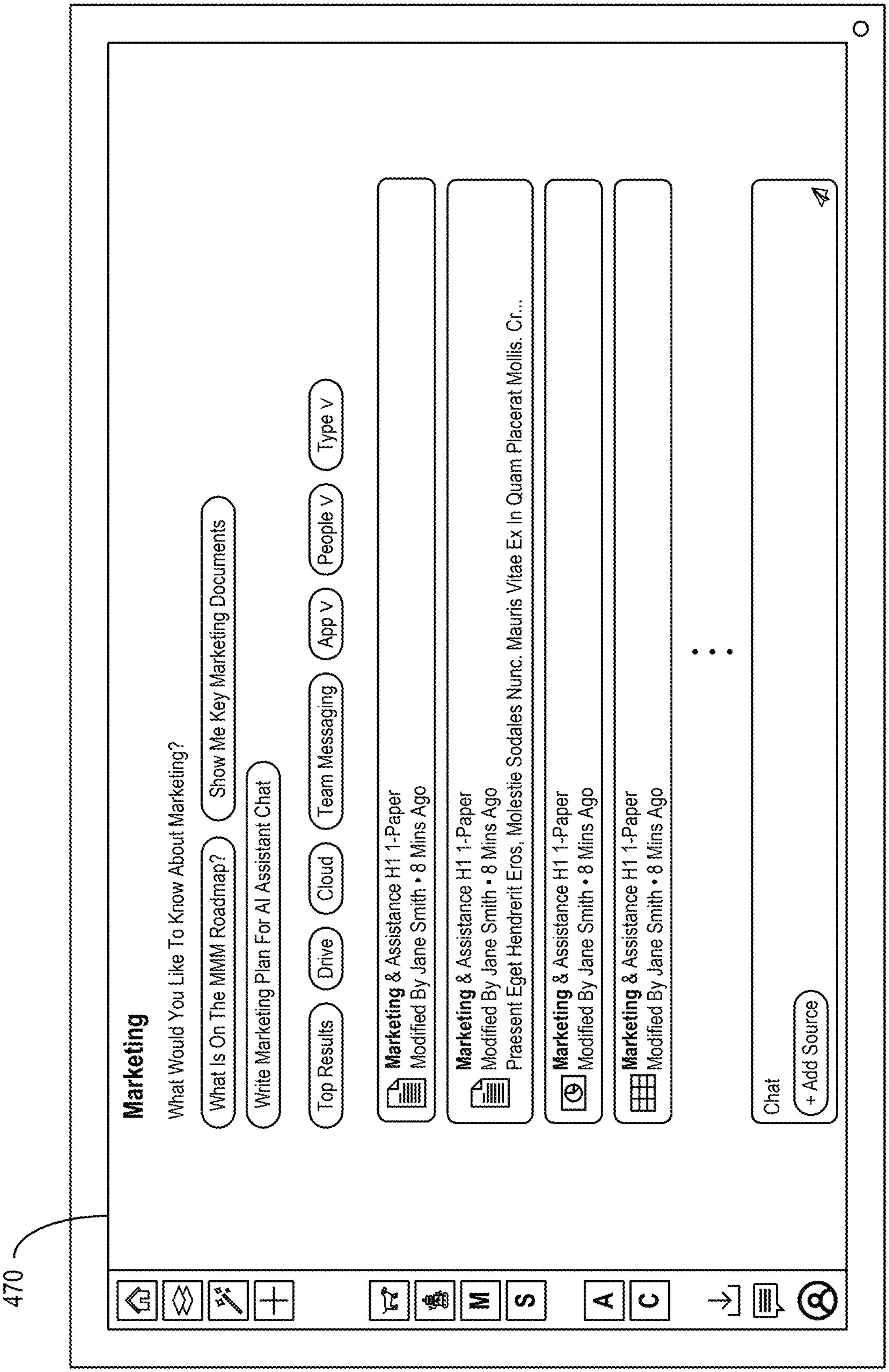

FIG. 4D illustrates a graphical user interface 440 that includes text content 442 that provides a long-form response, a list of content items 444 determined to be relevant, and a list of contacts 446 determined to be relevant. FIG. 4E illustrates a graphical user interface 450 that includes media viewers 452*a*-452*e* displaying the content of various content items, a selectable option 454 to view additional content items, and a set of selectable options 456 corresponding to pre-determined optional follow-up queries. FIG. 4F illustrates a graphical user interface 460 that includes a list of content items 462 determined to be relevant, and a set of selectable options 464 corresponding to pre-determined optional follow-up queries. FIG. 4G illustrates a graphical user interface 470 having similar interface elements.

Thus, as shown in FIGS. 4A-4G, the interface module configuration system 100 can respond to various queries using various user interface configurations. In particular, the interface module configuration system 100 can generate various user interfaces having interface elements corresponding to various content modules. The interface module configuration system 100 can configure each user interface based various factors, including relevant content items, query medium, device characteristics, preferences, and/or context. As such, the interface module configuration system 100 implements a flexible approach to responding to queries to provide responses that include accurate information.

Figure 5:
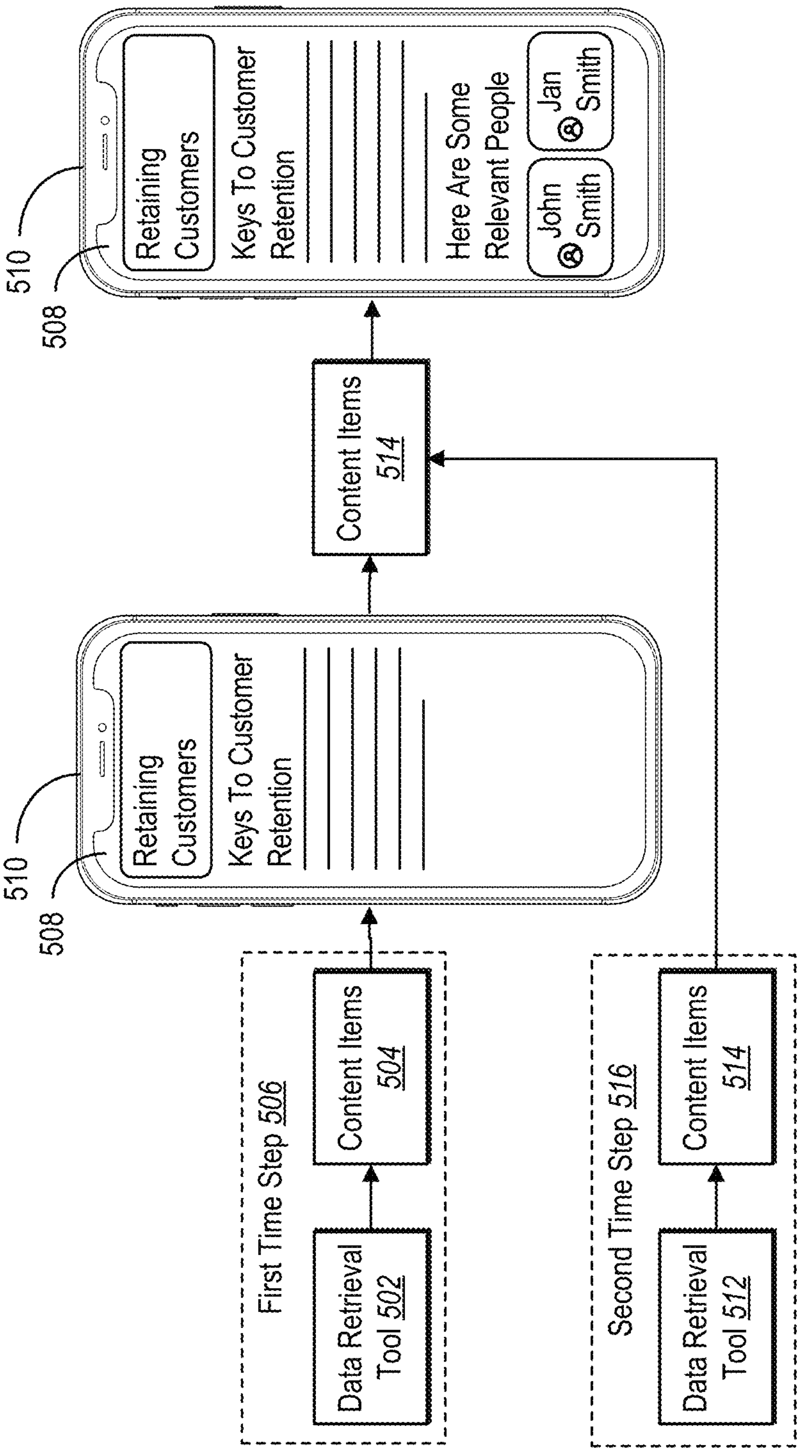
FIG. 5 illustrates configuring a user interface based on receiving content items at different times in accordance with one or more embodiments.

In some cases, the interface module configuration system 100 configures its responses based on the timing in which content items are obtained. In particular, the interface module configuration system 100 can configure a user interface used to respond to a query based on the timing of obtaining content items. FIG. 5 illustrates the interface module configuration system 100 configuring a user interface based on receiving content items at different times in accordance with one or more embodiments.

Indeed, in some cases, obtaining content items via one data retrieval tool is slower or faster than obtaining content items from another data retrieval tool. The timing of obtaining content items via a data retrieval tool can be influenced by various factors, including geographic location (e.g., the distance between a server device hosting the interface module configuration system 100 and a third-party server hosting the system that implements the data retrieval tool), the amount of information to be searched through, the number of content items found for the query, or the content type of the content items being searched. Thus, while the interface module configuration system 100 can obtain some content items fairly quickly (e.g., seconds or less), obtaining other content items can take minutes or hours in some cases.

To illustrate, FIG. 5 shows the interface module configuration system 100 receiving a first set of content items 504 from a first data retrieval tool 502 at a first time step 506 (e.g., a first instance of time). In response to receiving the first set of content items 504, the interface module configuration system 100 generates a user interface 508 for display on a client device 510 (in response to a query). In particular, the interface module configuration system 100 can generate the user interface 508 based on the first set of content items 504 by scoring the first set of content items 504, scoring corresponding content modules, and generating interface elements for one or more of the content modules based on the scores.

In some cases, the interface module configuration system 100 configures the user interface 508 to reserve space for interface elements corresponding to content modules that could be incorporated based on content items obtained via other data retrieval tools that have yet to respond to their tools calls. In some embodiments, the interface module configuration system 100 includes, in the user interface 508, a notice that the search for additional content items is still pending. In some cases, the interface module configuration system 100 indicates which content types have yet to be incorporated based on the data retrieval tools that have yet to respond.

As illustrated, the interface module configuration system 100 receives a second set of content items 514 from a second data retrieval tool 512 at a second time step 516 (e.g., a second instance of time). As further indicated, the second time step 516 occurs after the first time step 506 and occurs after generating the user interface 508 based on the first set of content items 504. Based on receiving the second set of content items 514, the interface module configuration system 100 updates the user interface 508 for display on the client device 510. In particular, the interface module configuration system 100 can update the user interface 508 to incorporate one or more additional content modules based on the second set of content items 514.

In some cases, the interface module configuration system 100 removes interface elements corresponding to one or more of the content modules incorporated based on the first set of content items 504 (e.g., based on available display space and/or content module scores) to incorporate interface elements based on the second set of content items 514. In some instances, the interface module configuration system 100 updates the content modules presently incorporated to add interface elements corresponding to the second set of content items 514.

In some implementations, the interface module configuration system 100 determines an expectation for a user interface to be generated in response to a query and generates the user interface based on the expectation. For instance, in some cases, the interface module configuration system 100 establishes an expectation of the content types that are expected to be obtained (or the data retrieval tools expected to obtain content items from) in response to a query. The interface module configuration system 100 can establish the expectation via hard coding (e.g., the interface module configuration system 100 expects certain data retrieval tools to provide content items in response to every query), based on an understanding of a particular query (e.g., expecting certain content types in response to a query having a particular classification), or based on communications from the data retrieval tools (e.g., a data retrieval tool providing content items or providing a token indicating that obtaining content items will take more time). Thus, as mentioned above, the interface module configuration system 100 can reserve space within a user interface based on the determined expectation in some instances and update the user interface as those data retrieval tools respond.

In some embodiments, the interface module configuration system 100 provides, via the user interface 508, an intermediate response to a query. For instance, the interface module configuration system 100 can provide the intermediate response before the first time step 506, after the first time step 506 but before the second time step 516, or after the second time step 516 but before providing the interface elements for display. For instance, as previously suggested, in some cases, the interface module configuration system 100 provides an indication that the search for content items or the configuration of the user interface 508 is pending. Indeed, the interface module configuration system 100 can provide one or more status updates regarding the development of a response to a query. To illustrate, the interface module configuration system 100 can provide an indication regarding the retrieval of relevant content items in response to a query, an indication that content items have been retrieved and are being evaluated, and/or an indication that the user interface is being generated to respond to the query. In some cases, if some data retrieval tools have provided content items but others are still searching, the interface module configuration system 100 can provide an indication that the search is still pending. For instance, as illustrated in FIG. 5, the interface module configuration system 100 can display interface elements related to the retrieved content items and leave space and/or provide an indication regarding the search that is still pending.

Thus, the interface module configuration system 100 can generate and provide a low latency response to a query while waiting for a more complete but higher latency response to be available. In particular, the interface module configuration system 100 can provide some intermediary response that either provides the user with the relevant information that has been retrieved so far or at least indicates that the response is in the process of being developed.

Figure 6:
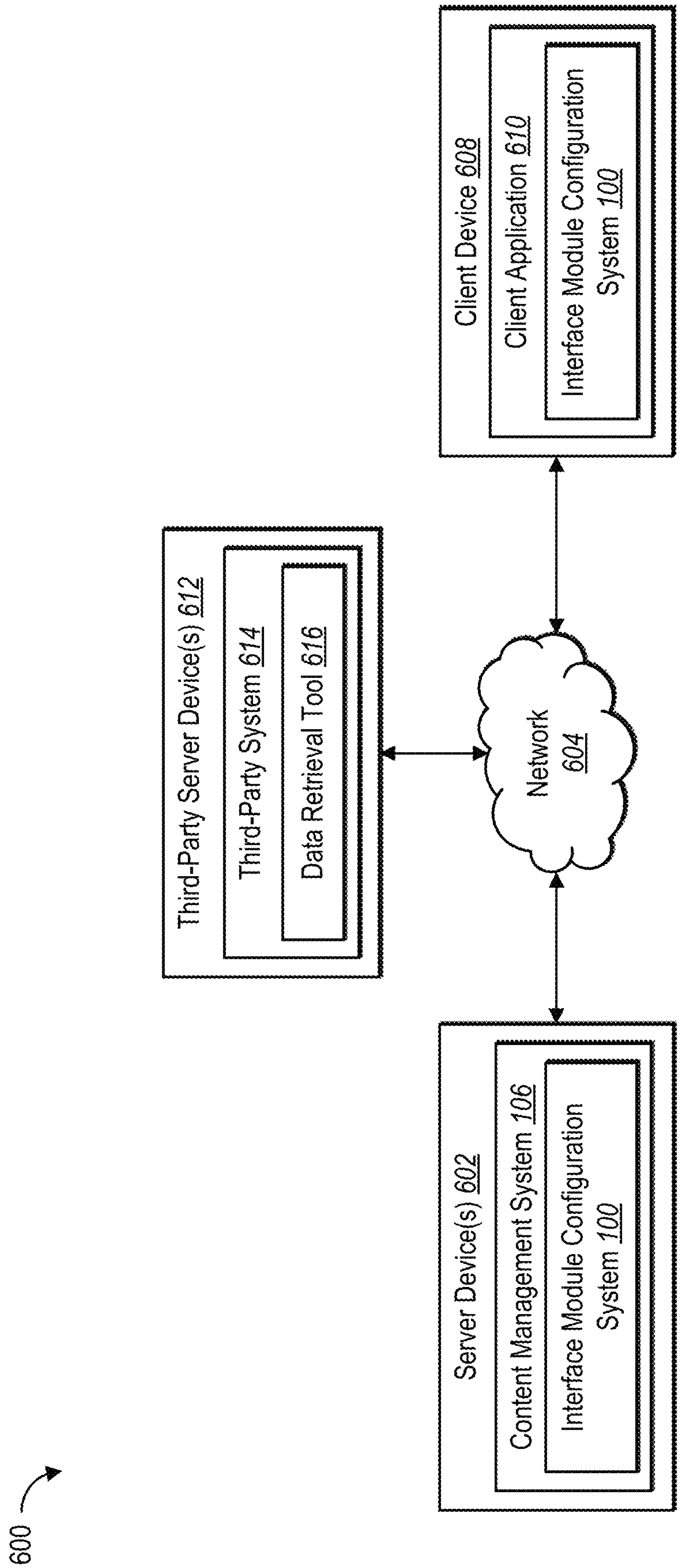
FIG. 6 illustrates an example environment within which an interface module configuration system can operate in accordance with one or more embodiments.

Additional detail regarding the environment within which one or more embodiments of the interface module configuration system 100 operates will now be provided. In particular, FIG. 6 illustrates a block diagram of a system environment ("environment") 600 for implementing the interface module configuration system 100 in accordance with one or more embodiments. As illustrated in FIG. 6, the environment 600 includes a server device(s) 602, a network 604, a client device 608, and a third-party server device(s) 612.

Although the environment 600 of FIG. 6 is depicted as having a particular number of components, the environment 600 can have any number of additional or alternative components (e.g., a different number of server devices, client devices, third-party server devices, or other components in communication with the interface module configuration system 100 via the network 604). Similarly, although FIG. 6 illustrates a particular arrangement of the server device(s) 602, the network 604, the client device 608, and the third-party server device(s) 612 various additional arrangements are possible.

The server device(s) 602, the network 604, the client device 608, and the third-party server device(s) 612 can be communicatively coupled with each other either directly or indirectly (e.g., through the network 604 as discussed in greater detail below in relation to FIG. 8). Moreover, the server device(s) 602, the client device 608, and the third-party server device(s) 612 may include a variety of computing devices (including one or more computing devices as discussed in greater detail with relation to FIG. 8).

As mentioned, the environment 600 includes the server device(s) 602. In one or more embodiments, the server device(s) 602 generates, stores, receives, and/or transmits digital data, including queries and query responses. For example, the server device(s) 602 can receive a query from the client device 608. In response, the server device(s) 602 can obtain relevant content items and generate a user interface based on those content items in response to the query. In one or more embodiments, the server device(s) 602 comprises a data server device. In some embodiments, the server device(s) 602 comprises a communication server device or a web-hosting server device.

As shown, the server device(s) 602 includes the content management system 106. In one or more embodiments, the content management system 106 provides a collection of features (e.g., services). For instance, the content management system 106 can provide features related to the creation, storage, and/or management of content items. For instance, the content management system 106 can provide features related to the searching and extraction of information contained within content items that are managed.

Additionally, the server device(s) 602 include the interface module configuration system 100. In one or more embodiments, the interface module configuration system 100 uses the server device(s) 602 to respond to queries. For instance, via the server device(s) 602, the interface module configuration system 100 can receive a query, obtain content items, and provide a user interface that incorporates content modules based on scores determined for the content items.

In one or more embodiments, the client device 608 includes a computing device that can access the content management system 106 (e.g., to utilize the features offered). For example, in some implementations, the client device 608 includes at least one of a smartphone, a tablet, a desktop computer, a laptop computer, a head-mounted-display device, or other electronic device. In some instances, the client device 608 includes one or more applications (e.g., the client application 610) that can access the content management system 106 (e.g., to utilize the features offered) . For example, in some embodiments, the client application 610 includes a software application installed on the client device 608. In other cases, however, the client application 610 includes a software application hosted on the server device(s) 602 (and supported by the content management system 106), which is accessible by the client device 608 through another application, such as a web browser.

As further shown, the environment 600 includes the third-party server device(s) 612. In one or more embodiments, the third-party server device(s) 612 hosts a third-party system 614 that implements a data retrieval tool 616. Thus, in some cases, the third-party server device(s) 612 receive tool calls from the interface module configuration system 100 (e.g., via the server device(s)) and provides obtained content items in response. In one or more embodiments, the third-party server device(s) 612 comprises a data server device. In some embodiments, the third-party server device(s) 612 comprises a communication server device or a web-hosting server device.

The interface module configuration system 100 can be implemented in whole, or in part, by the individual elements of the environment 600. Indeed, although FIG. 6 illustrates the interface module configuration system 100 implemented with regard to the server device(s) 602, different components of the interface module configuration system 100 can be implemented by a variety of devices within the environment 600. For example, one or more (or all) components of the interface module configuration system 100 can be implemented by a different computing device or a separate server device from the server device(s) 602 hosting the content management system 106. For instance, FIG. 6 illustrates that the interface module configuration system 100 can be implemented by the client device 608.

Each of the components of the interface module configuration system 100 optionally include software, hardware, or both. For example, in some cases, the components include one or more instructions stored on a computer-readable storage medium and executable by processors of one or more computing devices, such as a client device or server device. When executed by the one or more processors, the computer-executable instructions of one or more embodiments of the interface module configuration system 100 cause the computing device(s) to perform the methods described herein. Alternatively, in some instances, the components include hardware, such as a special-purpose processing device to perform a certain function or group of functions. Alternatively, in certain implementations, the components of the interface module configuration system 100 include a combination of computer-executable instructions and hardware.

Furthermore, in one or more embodiments, the components of the interface module configuration system 100 are, for example, implemented as one or more operating systems, as one or more stand-alone applications, as one or more modules of an application, as one or more plug-ins, as one or more library functions or functions that are called by other applications, and/or as a cloud-computing model. Thus, in some embodiments, the components of the interface module configuration system 100 are implemented as a stand-alone application, such as a desktop or mobile application. Furthermore, in some cases, the components of the interface module configuration system 100 are implemented as one or more web-based applications hosted on a remote server device. Alternatively, or additionally, the components of the interface module configuration system 100 are implemented in a suite of mobile device applications or "apps."

Figure 7:
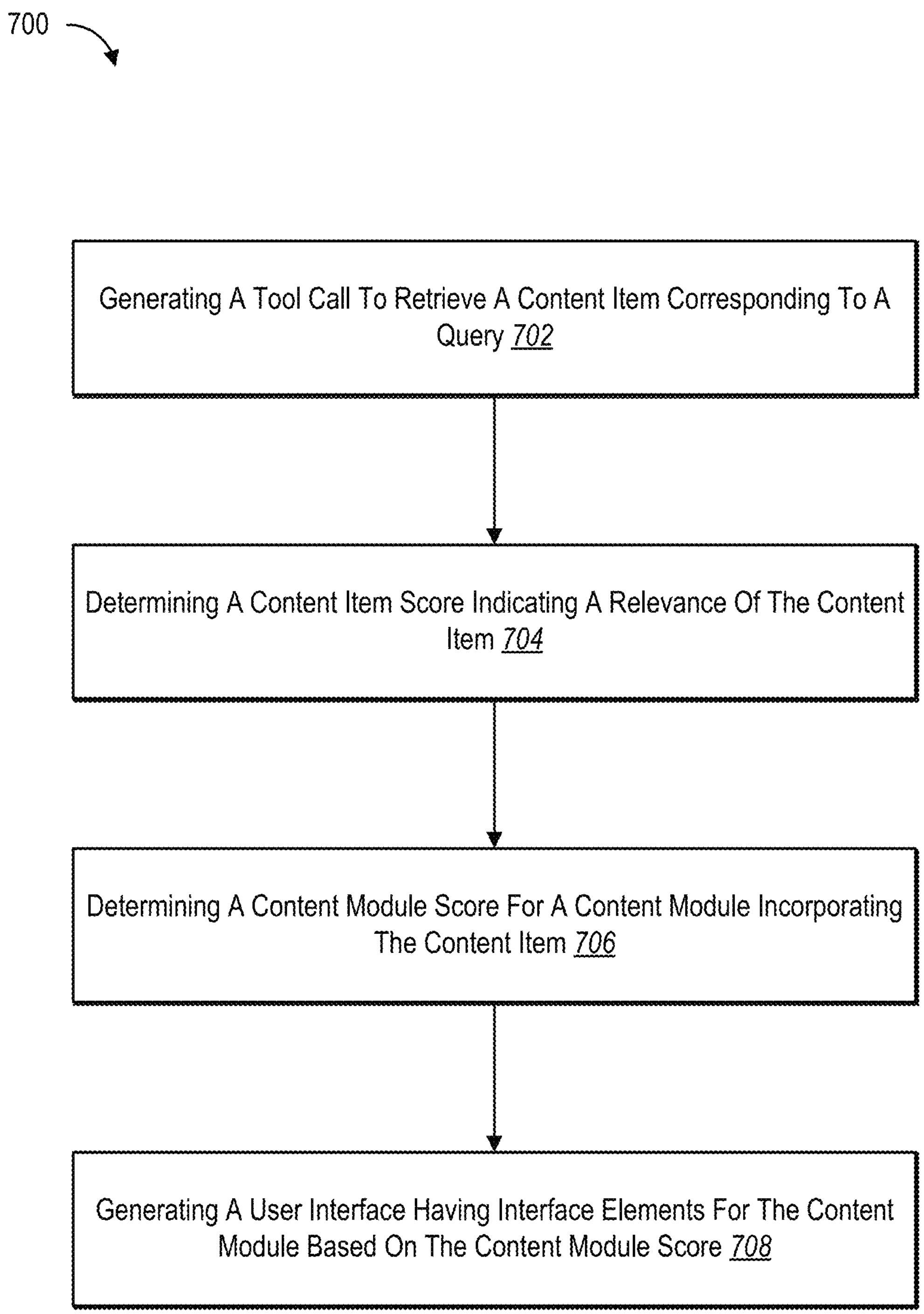
FIG. 7 illustrates a flowchart of a series of acts for configuring a user interface in response to a query in accordance with one or more embodiments.

FIGS. 1-6, the corresponding text and the examples provide a number of different methods, systems, devices, and non-transitory computer-readable media of the interface module configuration system 100. In addition to the foregoing, one or more embodiments can also be described in terms of flowcharts comprising acts for accomplishing particular results, as shown in FIG. 7. FIG. 7 may be performed with more or fewer acts. Further, the acts may be performed in different orders. Additionally, the acts described herein may be repeated or performed in parallel with one another or in parallel with different instances of the same or similar acts.

FIG. 7 illustrates a flowchart of a series of acts 700 for configuring a user interface in response to a query in accordance with one or more embodiments. FIG. 7 illustrates acts according to one embodiment, but alternative embodiments may omit, add to, reorder, and/or modify any of the acts shown in FIG. 7. In some implementations, the acts of FIG. 7 are performed as part of a method, such as a computer-implemented method. Alternatively, a non-transitory computer-readable medium can store instructions thereon that, when executed by at least one processor, cause the at least one processor to perform the acts of FIG. 7. In some embodiments, a system performs the acts of FIG. 7. For example, in one or more embodiments, a system includes at least one processor. The system further includes a non-transitory computer-readable medium storing instructions that, when executed by the at least one processor, cause the system to perform the acts of FIG. 7.

The series of acts 700 includes an act 702 of generating a tool call to retrieve a content item corresponding to a query. For instance, in one or more embodiments, the act 702 involves generating, using a first large language model of a generative interface framework to interpret a query received from a client device, a tool call instructing a data retrieval tool to retrieve a content item corresponding to the query. In one or more embodiments, receiving the query from the client device comprises receiving the query as part of a multi-turn conversation that includes the query and one or more previous client device inputs. As such, in some cases, generating the tool call using the first large language model comprises generating the tool call using the first large language model based the query and the one or more previous client device inputs of the multi-turn conversation.

The series of acts 700 also includes an act 704 of determining a content item score indicating a relevance of the content item. For example, in some embodiments, the act 704 involves determining, using a second large language model of the generative interface framework to process the content item, a content item score indicating a relevance of the content item to the query.

To illustrate, in some embodiments, generating, using the first large language model, the tool call instructing the data retrieval tool to retrieve the content item corresponding to the query comprises generating, using the first large language model, the tool call instructing an image retrieval tool to retrieve a digital image corresponding to the query. Thus, in some cases, determining, using the second large language model, the content item score indicating the relevance of the content item to the query comprises determining, using the second large language model, the content item score indicating the relevance of the digital image to the query and an image quality of the digital image.

Additionally, the series of acts 700 includes an act 706 of determining a content module score for a content module incorporating the content item. To illustrate, in some cases, the act 706 involves determining, for a content module including the content item and one or more additional content items, a content module score indicating a relevance of the content module to the query based on the content item score of the content item.

The series of acts 700 further includes an act 708 of generating a user interface having interface elements for the content module based on the content module score. For instance, in certain embodiments, the act 708 involves generating, by processing the content module using an interface orchestrator of the generative interface framework, a user interface having one or more interface elements corresponding to the content module based on the content module score. To illustrate, in some embodiments, generating the user interface having the one or more interface elements corresponding to the content module comprises generating the user interface having an interface element that includes a text-based answer derived from the content module, a list of content items from the content module, or a display of content items from the content module.

In some cases, the interface module configuration system 100 receives the query via a query medium (e.g., a search interface or a chat interface). Thus, in some cases, generating the user interface based on the content module score comprises generating the user interface based on the content module score and the query medium.

In some implementations, the interface module configuration system 100 further provides the user interface for display on the client device; receives, via the client device, a follow-up query comprising at least one user interaction with the one or more interface elements indicating a selection of the content item or the one or more additional content items; and generates a response to the follow-up query that incorporates the content item or the one or more additional content items.

In some cases, the interface module configuration system 100 obtains multiple content items via multiple data retrieval tools. For instance, in some embodiments, generating, using the first large language model, the tool call instructing the data retrieval tool to retrieve the content item comprises generating, using the first large language model, a first tool call instructing a first data retrieval tool to retrieve a first set of content items of a first content type, the first set of content items comprising the content item and the one or more additional content items. Additionally, the interface module configuration system 100 can generate, using the first large language model, a second tool call instructing a second data retrieval tool to retrieve a second set of content items of a second content type. As such, the interface module configuration system 100 can further determining, using the second large language model, additional content item scores for each content item from the second set of content items; and determining, for an additional content module comprising the second set of content items, an additional content module score indicating a relevance of the additional content module to the query based on the additional content item scores. Therefore, in some embodiments, generating the user interface based on the content module score comprises generating the user interface based on the content module score and the additional content module score. Additionally, in some cases, generating the user interface based on the content module score and the additional content module score comprises generating the user interface to include the one or more interface elements corresponding to the content module based on the content module score and to exclude interface elements corresponding to the additional content module based on the additional content module score.

In certain embodiments, the interface module configuration system 100 obtains content items via various data retrieval tools at different time steps. To illustrate, in some embodiments, receiving the content item from the data retrieval tool at a first time instance; and receiving the second set of content items from the second data retrieval tool at a second time instance that occurs after the first time instance. Thus, in some cases, generating the user interface based on the content module score comprises generating the user interface based on the content module score after receiving the content item and before receiving the second set of content items.

To provide an illustrate, in one or more embodiments, the interface module configuration system 100 generates, using a first large language model of a generative interface framework to interpret a query received from a client device, a tool call instructing a data retrieval tool to retrieve a set of content items corresponding to the query; determines, using a second large language model of the generative interface framework to process the set of content items, a content item score for each content item indicating a relevance of the content item to the query; determines, for the set of content items, a content module score indicating a relevance of the set of content items to the query based on the content item score determined for each content item; and generates, by processing the set of content items using an interface orchestrator of the generative interface framework, a user interface comprising one or more interface elements arranged for display based on the content module score.

To provide another illustration, in some embodiments, the interface module configuration system 100 generates, using a first large language model of a generative interface framework to interpret a query received from a client device, a first tool call instructing a first data retrieval tool to retrieve a first content item of a first content type and a second tool call instructing a second data retrieval tool to retrieve a second content item of a second content type; determines, using a second large language model of the generative interface framework, a first content item score indicating a first relevance of the first content item to the query and a second content item score indicating a second relevance of the second content item to the query; determines, for a first content module including the first content item and one or more additional content items of the first content type, a first content module score indicating a relevance of the first content module to the query based on the first content item score; determines, for a second content module including the second content item and one or more other content items of the second content type, a second content module score indicating a relevance of the second content module to the query based on the second content item score; and generates, using an interface orchestrator of the generative interface framework, a user interface comprising one or more interface elements corresponding to the first content item and the second content item based on the first content module score and the second content module score.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
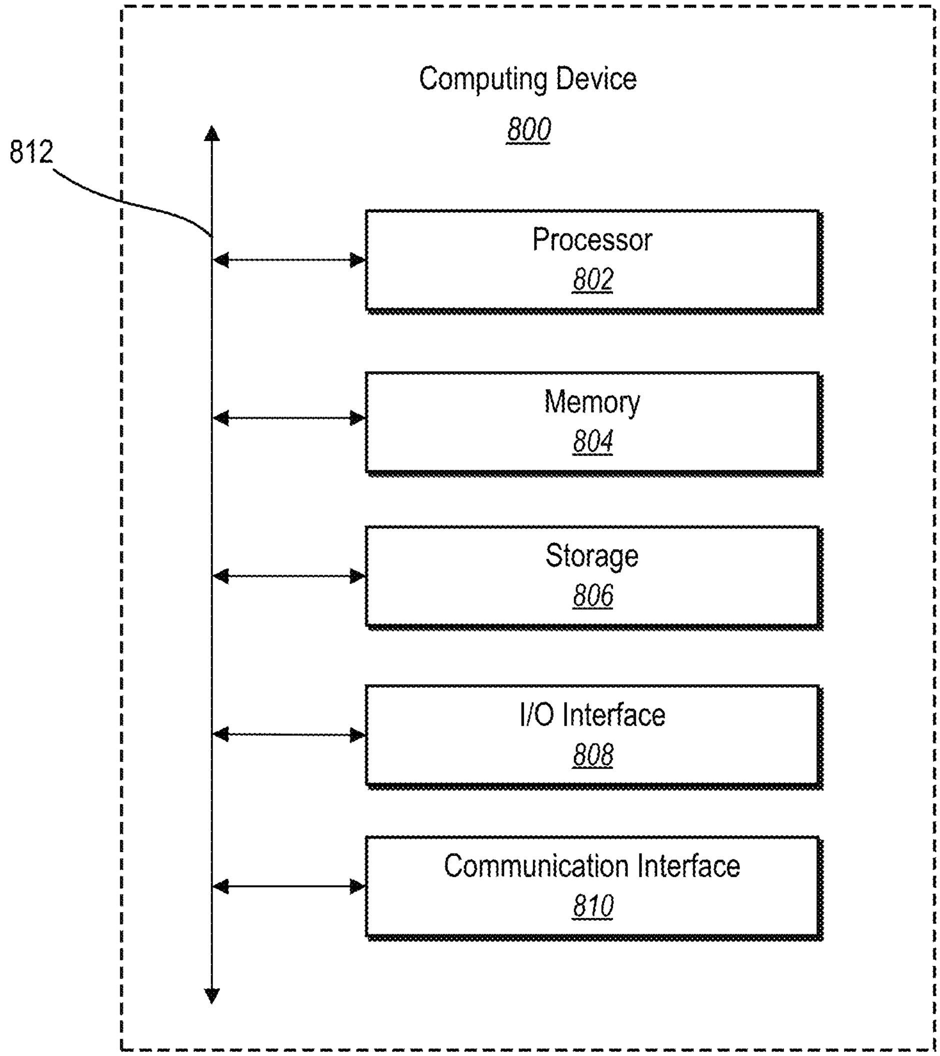
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the server device(s) 602, the client device 608, and/or the third-party device(s)). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

Figure 9:
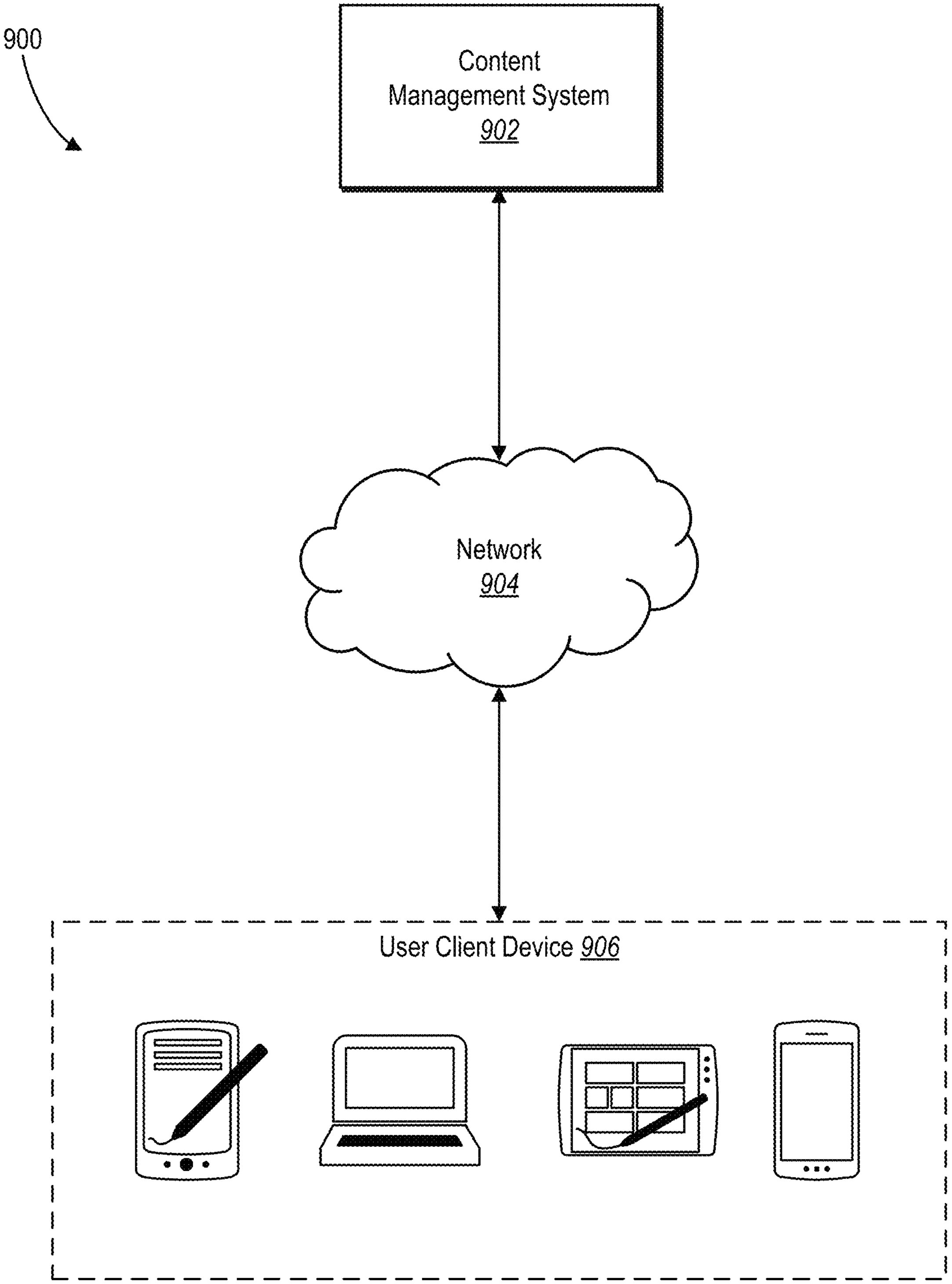
FIG. 9 illustrates a networking environment of an interface module configuration system in accordance with one or more embodiments.

FIG. 9 is a schematic diagram illustrating environment 900 within which one or more implementations of the interface module configuration system 100 can be implemented. As discussed above with respect to FIG. 9, in some embodiments the interface module configuration system 100 can be part of a content management system 902. In one or more embodiments, the content management system 902 may generate, store, manage, receive, and send digital content (such as digital videos). For example, content management system 902 may send and receive digital content to and from the user client device 906 by way of network 904. In particular, the content management system 902 can store and manage a collection of digital content. The content management system 902 can manage the sharing of digital content between computing devices associated with a plurality of users. For instance, the content management system 902 can facilitate a user sharing a digital content with another user of content management system 902.

In particular, the content management system 902 can manage synchronizing digital content across multiple of the user client device 906 associated with one or more users. For example, a user may edit digital content using user client device 906. The content management system 902 can cause user client device 906 to send the edited digital content to content management system 902. Content management system 902 then synchronizes the edited digital content on one or more additional computing devices.

In addition to synchronizing digital content across multiple devices, one or more implementations of content management system 902 can provide an efficient storage option for users that have large collections of digital content. For example, content management system 902 can store a collection of digital content on content management system 902, while the user client device 906 only stores reduced-sized versions of the digital content. A user can navigate and browse the reduced-sized versions (e.g., a thumbnail of a digital image) of the digital content on user client device 906. In particular, one way in which a user can experience digital content is to browse the reduced-sized versions of the digital content on user client device 906.

Another way in which a user can experience digital content is to select a reduced-size version of digital content to request the full- or high-resolution version of digital content from content management system 902. In particular, upon a user selecting a reduced-sized version of digital content, user client device 906 sends a request to content management system 902 requesting the digital content associated with the reduced-sized version of the digital content. Content management system 902 can respond to the request by sending the digital content to user client device 906. User client device 906, upon receiving the digital content, can then present the digital content to the user. In this way, a user can have access to large collections of digital content while minimizing the amount of resources used on user client device 906.

User client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 906 may access content management system 902.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, using a first large language model of a generative interface framework to interpret a query received from a client device, a tool call instructing a data retrieval tool to retrieve a content item corresponding to the query;

determining, using a second large language model of the generative interface framework to process the content item, a content item score indicating a relevance of the content item to the query;

determining, for each content module from a set of content modules, a content module score indicating a relevance of the content module to the query based on the content item score of the content item, wherein:

each content module from the set of content modules includes a user interface unit that is configurable via inclusion of one or more interface elements that correspond to one or more content items;

the set of content modules includes at least one content module having at least one interface element corresponding to the content item and one or more additional content items; and the set of content modules includes one or more content modules having interface elements corresponding to content items of multiple content types; and generating, by processing the at least one content module using an interface orchestrator of the generative interface framework, a user interface having the at least one interface element in response to selecting the at least one content module from the set of content modules based on the content module score determined for each content module.

2. The computer-implemented method of claim 1, wherein generating, using the first large language model, the tool call instructing the data retrieval tool to retrieve the content item comprises generating, using the first large language model, a first tool call instructing a first data retrieval tool to retrieve a first set of content items of a first content type, the first set of content items comprising the content item and the one or more additional content items; and further comprising generating, using the first large language model, a second tool call instructing a second data retrieval tool to retrieve a second set of content items of a second content type.

3. The computer-implemented method of claim 2, further comprising:

determining, using the second large language model, additional content item scores for each content item from the second set of content items, wherein determining, for each content module from the set of content modules, the content module score indicating the relevance of the content module to the query based on the content item score of the content item comprises determining the content module score for each content module based on the content item score and the additional content item scores.

4. The computer-implemented method of claim 3, wherein generating the user interface having the at least one interface element based on the content module score determined for each content module comprises generating the user interface to include the at least one interface element corresponding to the content module and to exclude interface elements corresponding to the additional content modules based on the content module score determined for each content module.

5. The computer-implemented method of claim 2, further comprising:

receiving the content item from the data retrieval tool at a first time instance; and receiving the second set of content items from the second data retrieval tool at a second time instance that occurs after the first time instance, wherein generating the user interface based on the content module score comprises generating the user interface based on the content module score after receiving the content item and before receiving the second set of content items.

6. The computer-implemented method of claim 1, wherein:

receiving the query from the client device comprises receiving the query as part of a multi-turn conversation that includes the query and one or more previous client device inputs; and generating the tool call using the first large language model comprises generating the tool call using the first large language model based the query and the one or more previous client device inputs of the multi-turn conversation.

7. The computer-implemented method of claim 1, further comprising receiving the query via a query medium, wherein generating the user interface based on the content module score determined for each content module comprises generating the user interface based on the content module score determined for each content module and the query medium.

8. The computer-implemented method of claim 1, further comprising:

providing the user interface for display on the client device;

receiving, via the client device, a follow-up query comprising at least one user interaction with the one or more interface elements indicating a selection of the content item or the one or more additional content items; and generating a response to the follow-up query that incorporates the content item or the one or more additional content items.

9. The computer-implemented method of claim 1, wherein:

generating, using the first large language model, the tool call instructing the data retrieval tool to retrieve the content item corresponding to the query comprises generating, using the first large language model, the tool call instructing an image retrieval tool to retrieve a digital image corresponding to the query; and determining, using the second large language model, the content item score indicating the relevance of the content item to the query comprises determining, using the second large language model, the content item score indicating the relevance of the digital image to the query and an image quality of the digital image.

10. The computer-implemented method of claim 1, further comprising generating, based on the query and using the first large language model, a relevancy rubric that indicates one or more factors to use in scoring content items, wherein determining, using the second large language model, the content item score for the content item comprises using the second large language model to determine the content item score for the content item in accordance with the relevancy rubric.

11. A system comprising:

at least one processor; and a non-transitory computer-readable medium comprising instructions that, when executed by the at least one processor, cause the system to:

generate, using a first large language model of a generative interface framework to interpret a query received from a client device, a tool call instructing a data retrieval tool to retrieve a set of content items corresponding to the query;

determine, using a second large language model of the generative interface framework to process the set of content items, a content item score for each content item indicating a relevance of the content item to the query;

determine, for each content module from a set of content modules, a content module score indicating a relevance of the set of content items content module to the query based on the content item score determined for each content item, wherein:

each content module from the set of content modules includes a user interface unit that is configurable via inclusion of one or more interface elements that correspond to one or more content items;

the set of content modules includes at least one content module having at least one interface element corresponding to the set of content items; and the set of content modules includes one or more content modules having interface elements corresponding to content items of multiple content types; and generate, by processing the set of content items using an interface orchestrator of the generative interface framework, a user interface comprising the at least one interface element of the at least one content module arranged for display based on the content module score determined for each content module.

12. The system of claim 11, further comprising instructions that, when executed by the at least one processor, cause the system to:

generate, using the first large language model, the tool call instructing the data retrieval tool to retrieve the set of content items by generating, using the first large language model, the tool call instructing the data retrieval tool to retrieve the set of content items of a first content type; and generate, using the first large language model, an additional tool call instructing an additional data retrieval tool to retrieve an additional set of content items of a second content type.

13. The system of claim 12, further comprising instructions that, when executed by the at least one processor, cause the system to:

determine, using the second large language model, an additional content item score for each content item from the additional set of content items; and determining, for each content module from the set of content modules, the content module score indicating the relevance of the content module to the query based on the content item score determined for each content item comprises determining the content module score for each content module based on the content item score determined for each content item from the set of content items and the additional content item score determined for each content item from the additional set of content items.

14. The system of claim 13, further comprising instructions that, when executed by the at least one processor, cause the system to generate the user interface based on the content module score determined for each content module by generating the user interface to include a first set of interface elements corresponding to the set of content items and to exclude a second set of interface elements corresponding to the additional set of content items based on the content module score determined for each content module.

15. The system of claim 12, further comprising instructions that, when executed by the at least one processor, cause the system to:

receive the set of content items from the data retrieval tool at a first time instance;

receive the additional set of content items from the additional data retrieval tool at a second time instance that occurs after the first time instance; and generate the user interface based on the content module score by generating the user interface based on the content module score after receiving the set of content items and before receiving the additional set of content items.

16. The system of claim 12, further comprising instructions that, when executed by the at least one processor, cause the system to:

receive the query from the client device by receiving the query as part of a multi-turn conversation that includes the query and one or more previous client device inputs; and generate the tool call using the first large language model by generating the tool call using the first large language model based the query and the one or more previous client device inputs of the multi-turn conversation.

17. A non-transitory computer-readable medium comprising instructions that, when executed by at least one processor, cause the at least one processor to:

generate, using a first large language model of a generative interface framework to interpret a query received from a client device, a first tool call instructing a first data retrieval tool to retrieve a first content item of a first content type and a second tool call instructing a second data retrieval tool to retrieve a second content item of a second content type;

determine, using a second large language model of the generative interface framework, a first content item score indicating a first relevance of the first content item to the query and a second content item score indicating a second relevance of the second content item to the query;

determine, for a first content module that includes one or more interface elements corresponding to the first content item and one or more additional content items of the first content type, a first content module score indicating a relevance of the first content module to the query based on the first content item score;

determine, for a second content module that includes one or more additional interface elements corresponding to the second content item and one or more other content items of the second content type, a second content module score indicating a relevance of the second content module to the query based on the second content item score, wherein:

each of the first content module and the second content module includes a user interface unit that is configurable via inclusion of one or more interface elements that correspond to one or more content items; and at least one of the first content module or the second content module has interface elements corresponding to content items of multiple content types; and generate, using an interface orchestrator of the generative interface framework, a user interface comprising a set of interface elements having at least one interface element from the one or more interface elements of the first content item and at least one additional interface element from the one or more additional interface elements of the second content item based on the first content module score and the second content module score.

18. The non-transitory computer-readable medium of claim 17, further comprising instructions that, when executed by the at least one processor, cause the at least one processor to:

receive the query via a query medium; and generate the user interface based on the first content module score and the second content module score by generating the user interface based on the first content module score, the second content module score, and the query medium.

19. The non-transitory computer-readable medium of claim 17, further comprising instructions that, when executed by the at least one processor, cause the at least one processor to:

provide the user interface for display on the client device;

receive, via the client device, a follow-up query comprising at least one user interaction with the one or more interface elements indicating a selection of the first content item or the second content item; and generate a response to the follow-up query that incorporates the first content item or the second content item.

20. The non-transitory computer-readable medium of claim 17, further comprising instructions that, when executed by the at least one processor, cause the at least one processor to:

receive the query from the client device by receiving the query as part of a multi-turn conversation that includes the query and one or more previous client device inputs; and generate the first tool call and the second tool call using the first large language model by generating the first tool call and the second tool call using the first large language model based the query and the one or more previous client device inputs of the multi-turn conversation.

* * * * *